United States Patent
Kawamoto et al.

(10) Patent No.: US 7,991,360 B2
(45) Date of Patent: Aug. 2, 2011

(54) RECEIVER APPARATUS, RECEIVING METHOD, AND WIRELESS COMMUNICATION SYSTEM

(75) Inventors: Junichiro Kawamoto, Yokohama (JP); Noriyuki Maeda, Yokohama (JP); Kenichi Higuchi, Yokohama (JP); Mamoru Sawahashi, Yokohama (JP); Shousei Yoshida, Minato-ku (JP); Masayuki Kimata, Minato-ku (JP)

(73) Assignees: NTT DoCoMo, Inc., Tokyo (JP); NEC Corporation, Tokyo (JP)

( * ) Notice: Subject to any disclaimer, the term of this patent is extended or adjusted under 35 U.S.C. 154(b) by 490 days.

(21) Appl. No.: 10/591,663

(22) PCT Filed: Mar. 4, 2005

(86) PCT No.: PCT/JP2005/003774
§ 371 (c)(1),
(2), (4) Date: Dec. 22, 2006

(87) PCT Pub. No.: WO2005/086402
PCT Pub. Date: Sep. 15, 2005

(65) Prior Publication Data
US 2007/0197166 A1    Aug. 23, 2007

(30) Foreign Application Priority Data

Mar. 5, 2004  (JP) ................................ 2004-063197

(51) Int. Cl.
*H04B 1/10* (2006.01)
(52) U.S. Cl. ........................... 455/65; 375/342; 370/342
(58) Field of Classification Search .................... 370/342
See application file for complete search history.

(56) References Cited

U.S. PATENT DOCUMENTS

| 5,887,034 A * | 3/1999 | Suzuki ........................... 375/285 |
| 6,661,835 B1 * | 12/2003 | Sugimoto et al. ............. 375/148 |

(Continued)

FOREIGN PATENT DOCUMENTS

JP    2003 152603    5/2003

(Continued)

OTHER PUBLICATIONS

KaLeong Lo, et al., "Layered Space Time Coding with Joint Iterative Detection, Channel Estimation and Decoding", Spread Spectrum Techniques and Applications, 2002 IEEE Seventh International Symposium on Sep. 2-5, 2002 Piscataway, NJ, USA, IEEE vol. 2, XP 010615481, Sep. 2, 2002 pp. 308-312.

(Continued)

*Primary Examiner* — Nghi H Ly
*Assistant Examiner* — Joseph Dean, Jr.
(74) *Attorney, Agent, or Firm* — Oblon, Spivak, McClelland, Maier & Neustadt, L.L.P.

(57) ABSTRACT

A receiving apparatus, a receiving method, and a radio communications system are disclosed. The receiving apparatus is for receiving CDMA signals transmitted by M antennas and received by N antennas, where M and N are positive integers. The receiving apparatus includes a multipath receiving signal demodulating unit for primary demodulation of the CDMA signals received by the receiving antennas to obtain estimated transmission signals, and for obtaining signals in a multipath environment of each path of the receiving antennas based on the estimated results. Further, the receiving apparatus includes a multipath interference canceling unit for deducting signals of the paths other than a target path from the signals received by the receiving antennas to obtain multipath interference cancelled signals. Further, the receiving apparatus includes a demodulator for secondary demodulation of the multipath interference cancelled signals.

13 Claims, 16 Drawing Sheets

U.S. PATENT DOCUMENTS

| | | | | |
|---|---|---|---|---|
| 2003/0067971 | A1* | 4/2003 | Miyoshi et al. | 375/150 |
| 2003/0139139 | A1* | 7/2003 | Onggosanusi et al. | 455/63 |
| 2003/0179814 | A1* | 9/2003 | Juntti et al. | 375/148 |
| 2004/0032900 | A1 | 2/2004 | Horng et al. | |
| 2004/0082356 | A1* | 4/2004 | Walton et al. | 455/522 |
| 2004/0120415 | A1* | 6/2004 | Song et al. | 375/262 |
| 2007/0211836 | A1* | 9/2007 | Chitrapu et al. | 375/346 |

FOREIGN PATENT DOCUMENTS

| | | |
|---|---|---|
| JP | 2004 96603 | 3/2004 |

OTHER PUBLICATIONS

Yumin Zhang, et al. "Multistage multiuser detection for CDMA with space-time coding", Statistical signal and array processing, 2000, Proceedings of the tenth IEEE workshop on Aug. 14-16, 2000, Piscataway, NJ, USA, IEEE, XP 010512110, Aug. 14, 2000, pp. 1-5.

Abe Tetsushi et al., "Performance Evaluation of a Space-Time Turbo Equalizer in Frequency Selective MIMO Channels Using Field Measurement Data", MIMO: Communications Systems From Concept to Implemetations, pp. 21/1-21/5, 2001.

Kenichi Higuchi et al., "Throughput Performance of High-Speed Packet Transmission With Adaptive Modulation and Coding Scheme Using Multipath Interference Canceller in W-CDMA Forward Link", The Institute of Electronics, Information and Communication Engineers, vol. 100, No. 134, pp. 45-52, 2000. (with English abstract).

Takumi Itoh et al., "Comparison of Complexity-Reduced Maximum Likelihood Detection Based on Symbol Replica-Candidate Selection With or Decomposition on Throughput and Computational Complexity in OFCDM MIMO Multiplexing", The Intitute of Electronics, Information and Communication Engineers, vol. 103, No. 80, pp. 61-66, 2004. (with English abstract).

Gerard J. Foshini, "Layered Space-Time Architecture for Wireless Communication in a Fading Environment When Using Multi-Element Antennas", Bell Labs Technical Journal, vol. 1 No. 2, pp. 41-59, 1996.

Bin Dong et al., "Sampling-Based Near-Optimal MIMO Demodulation Algorithms", Proceedings of the 42 nd IEEE, pp. 4214-4219, 2003.

Kenichi Higuchi et al., "Multipath Interference Canceller for High-Speed Packet Transmission With Adaptive Modulation and Coding Sheme in W-CDMA Forward Link", IEEE Journal on Selected Areas in Communications, vol. 20, No. 2, pp. 419-432, 2002.

Frederick Petre et al., "Combined Space-Time Chip Equalization and Parallel Interference Cancellation for DS-CDMA Downlink With Spatial Multiplexing", IEEE PIMRC2002, pp. 1117-1121, 2002.

* cited by examiner

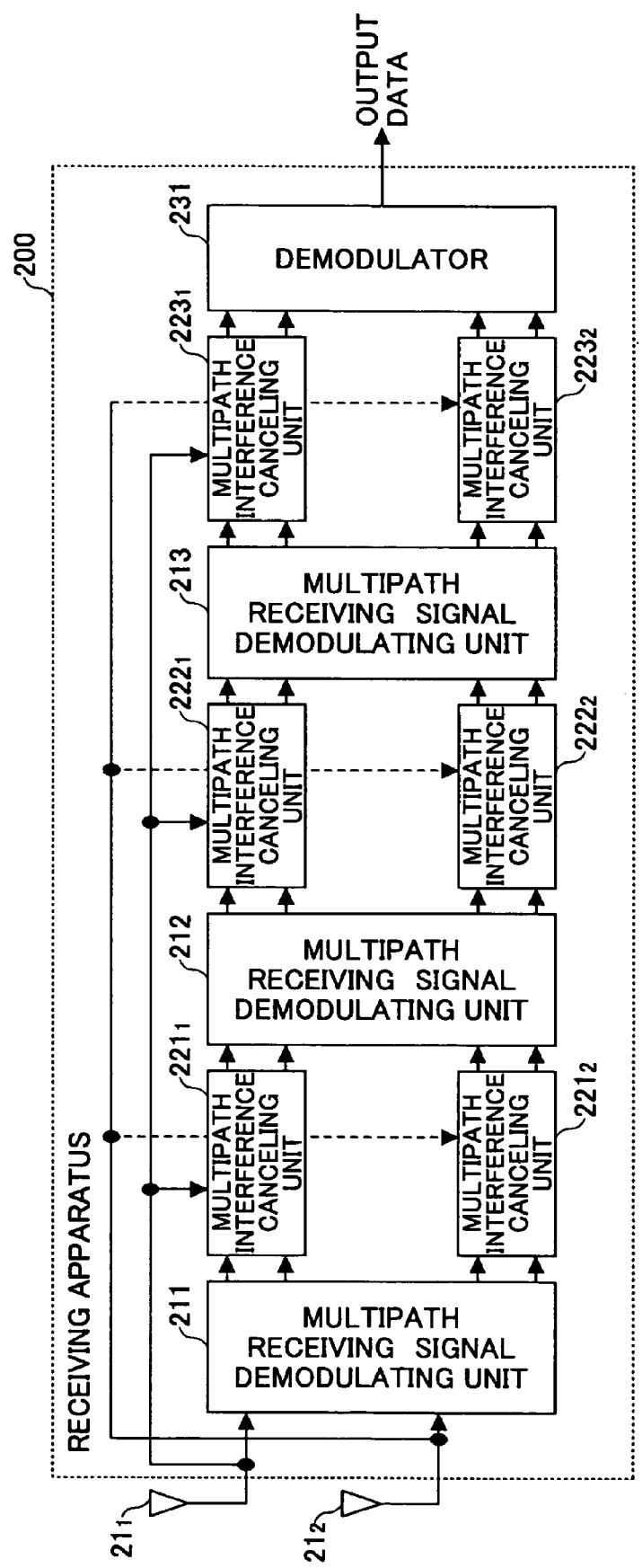

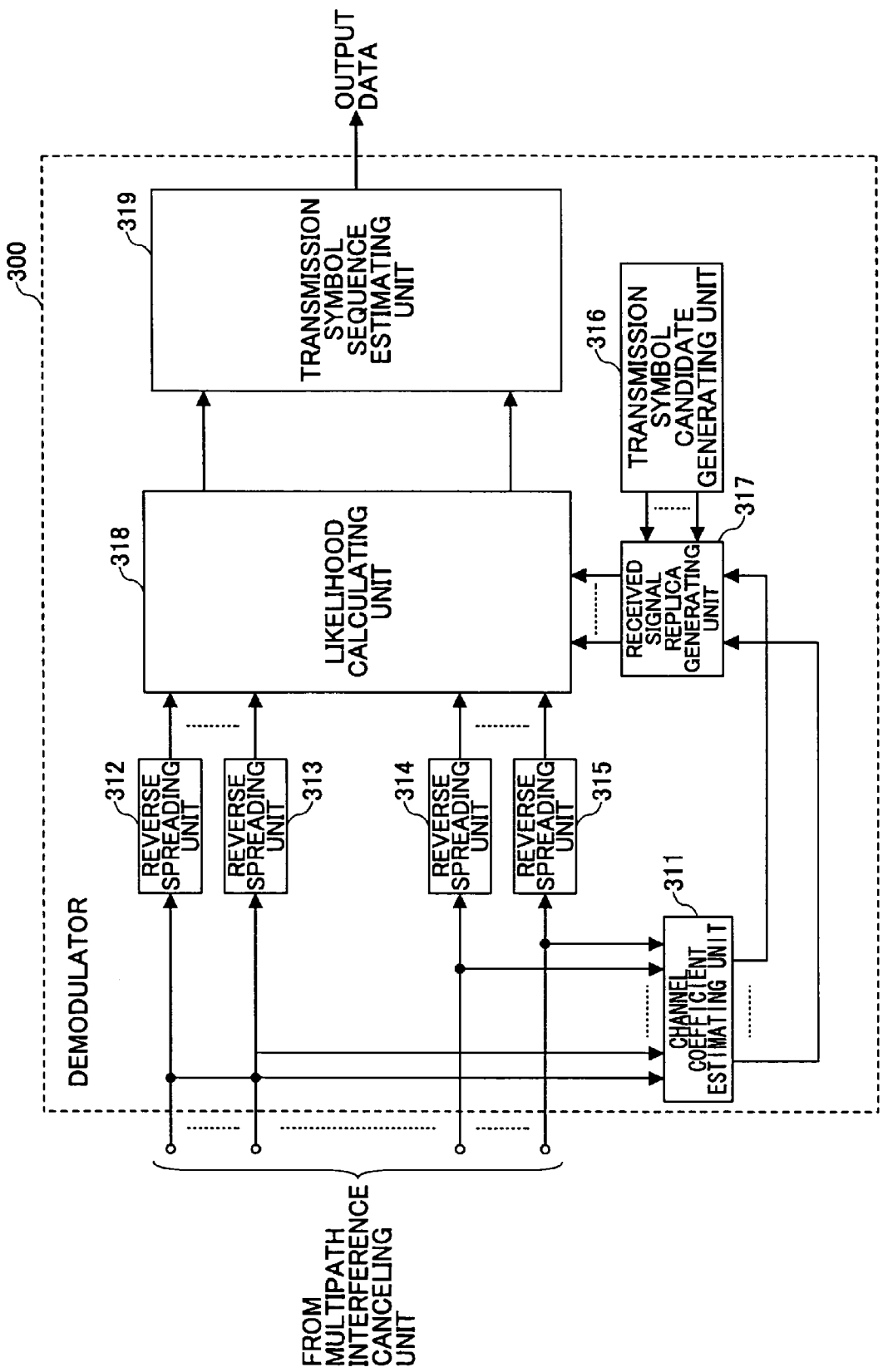

RECEIVER APPARATUS, RECEIVING METHOD, AND WIRELESS COMMUNICATION SYSTEM

BACKGROUND OF THE INVENTION

1. Field of the Invention

The present invention relates to a receiving apparatus, a receiving method, and a radio communications system for demodulating (separating) a signal using two or more antennas.

2. Description of the Related Art

In the fourth generation mobile communications, a radio communications method that is capable of providing a high transmission speed is required. From this viewpoint, a MIMO (multiple inputs and multiple outputs, i.e., two or more I/O) multiplexing method attracts attention, wherein each of antennas (for transmission and reception) transmits a different signal from others at the same time and the same frequency using MIMO channels.

The MIMO multiplexing method is described with reference to FIG. 14 that shows the configuration of a MIMO communication system using two or more antennas. According to this system, the transmission speed is increased in proportion to the number of transmitting antennas without increasing a transmission bandwidth by antennas $1011_1$ through $1011_N$ transmitting respective different signals at the same frequency, and antennas $1021_1$ through $1021_N$ simultaneously receiving all the different signals (for example, Non-patent Reference 1).

Further, BLAST (Bell Labs Layered Space-Time) is one of the technologies generically named MIMO. According to BLAST, different signals are simultaneously transmitted at the same frequency, i.e., a parallel transmission, from two or more transmitting antennas; and, on the receiving side, the signals are separated by diversity reception that is controlled by interference suppression and by a replicas subtraction (for example, Non-patent Reference 1).

As described above, while it is possible to realize a high transmission speed by the MIMO multiplexing method, since different data sequences are transmitted from the transmitting antennas at the same frequency and at the same time slot, a receiving unit is required to separate the signals in order to extract the data sequences transmitted from each transmitting antenna from the received signal for demodulation.

Various methods are proposed for separating the MIMO multiplexed signals. For example, according to a signal separation algorithm using a linear filter such a minimum mean square error (MMSE) method, and a zero forcing (ZF) method, signals received by antennas, the number of which antennas is equal to or greater than the number of the transmitting antennas, are compounded such that receiving power from transmitting antennas other than a target transmitting antenna is suppressed (minimized). According to this method, the amount of operations on the receiving side is relatively small.

Further, according to a signal separation algorithm using a maximum likelihood detection method (MLD), replica candidates of signals received from each transmitting antenna are generated, and a replica of a received signal that gives the smallest Euclidean distance between the received signal and a sum of the replica candidates of the signals received from all the transmitting antennas is obtained. In this way, the MLD method gives the most probable signal sequence of each transmitting antenna. The MLD method provides more accurate signal separation and superior demodulation performance as compared with the MMSE method; however, the amount of operations required of signal separation exponentially increases as the number of the antennas is increased. Then, a proposal (for example, Non-patent Reference 2) is made wherein the amount of operations is decreased in the MLD by greatly decreasing the number of signal point candidates for calculating the square Euclidean distance using QR factorization.

By the way, conventional direct spreading (DS) CDMA is a communication method wherein a secondary modulation is performed for spectrum-spreading a signal that is modulated by conventional information data with a high-speed spreading signal such that two or more parties can communicate using the same frequency band. In the radio communications using DS-CDMA, as the bandwidth used for signal transmission becomes great, multipath fading (frequency selective fading) is generated, and a transmission signal is received through two or more paths (multipath) having different propagation delay times.

While receiving quality can be improved in DS-CDMA with a rake reception method, wherein two or more signals through the multipath are compounded, interference (multipath interference) is generated between different paths. For this reason, the receiving quality improvement by the rake reception method is offset by the multipath interference.

The magnitude of the multipath interference is proportional to the inverse number of a spreading rate that is defined by a ratio of a chip rate (representing a speed of multiplication by the spreading signal) to a symbol rate of information symbols. For this reason, if the spreading rate is brought close to 1 in an attempt to increase an information bit rate, degradation of the receiving quality due to the multipath interference becomes dominant rather than the improvement obtained by the rake reception method. This poses a problem in that the receiving quality is degraded when transmitting at a high speed. Then, in an attempt to cope with the problem, a multipath interference canceller is proposed (for example, Non-patent Reference 3).

According to the multipath interference canceller as disclosed by Non-patent Reference 3, high quality reception under a multipath environment is realized by estimating a received signal sequence for every path based on an signal sequence that is estimated by a provisional rake receiving result and a channel coefficient (complex envelope of a propagation path) of each reception path, deducting all estimated signal sequences obtained from paths other than a certain path (a target path) from the received signal, and repeating the deducting operation for all the paths. In this way, the multipath interference of the signal of every path is reduced. Then, using the signals, for the multipath interference of which signals have been reduced, a final rake reception is carried out.

Further, 2-dimensional MMSE is proposed as a signal separating method, whereby the multipath interference in MIMO multiplexing in the radio communications using DS-CDMA is reduced, With the 2-dimensional MMSE, both interference generated by received signals from other transmitting antennas and multipath interference are simultaneously reduced.

[Non-patent Reference 1] G. J. Foschini, Layered Space-Time Architecture for Wireless Communication in a Fading Environment When Using Multiple Antennas, Bell Labs Technical Journal, Vol. 1, No. 2, autumn 1996, pp 41 through 59.

[Non-patent Reference 2] Bin Dong, Xaodong Wang, and Amaud Doucet, "Sampling-based Near-optimal MIMO demodulation Algorithms" in Proc. 42nd IEEE Conference on Decision and Control, Hawaii, December, 2003

[Non-patent Reference 3] K. Higuchi, A. Fujiwara, and M. Sawahashi, "Multipath Interference Canceller for High-Speed Packet Transmission With Adaptive Modulation and Coding Scheme in W-CDMA Forward Link," IEEE J. Select. Areas Commun., Vol. 20, No. 2, pp. 419 through 432, February 2002.

[Non-patent Reference 4] Frederik Petre et. al, "Combined Space-Time Chip Equalization And Parallel Interference Cancellation For DS-CDMA Downlink With Spatial Multiplexing" in Proc. IEEE PIMRC 2002.

SUMMARY OF THE INVENTION

Problem(s) to be Solved by the Invention

When applying the MIMO multiplexing method as described above for increasing the information bit rate of the radio communications using DS-CDMA, the spreading rate should be made small such that the information bit rate per transmitting antenna can be increased. In this case, as shown in FIG. 15, there are generated mutual interference between the transmitting antennas of the paths of the same receiving timing (indicated by (a) in FIG. 15), and the multipath interference (indicated by (b) and (c) in FIG. 15) from the multiple paths of all the transmitting antennas of different receiving timings. For this reason, accuracy of the signal separation on the receiving side is greatly degraded due to the multipath interference as in the case of the rake reception with one antenna transmission described above.

The proposed multipath interference canceller described above is configured in consideration of a signal transmitted from only one antenna. If this is applied to MIMO multiplexing, accurate estimation of a signal sequence with the rake reception cannot be obtained.

Further, as evident from FIG. 15, the multipath interference in the case of MIMO multiplexing is generated not only by one antenna, but also by two or more antennas. Accordingly, it is necessary to reduce the multipath interference due to multiple antennas for highly accurate reception.

However, the signal separation of the MMSE method theoretically is poorer than the MLD method, and a desired performance cannot be obtained on the receiving side. Further, according to the 2-dimensional MMSE method, a filter coefficient is controlled in an attempt to reduce both the interference generated by the received signals from other transmitting antennas and the multipath interference. For this reason, signal separation accuracy is further degraded, posing a problem.

The present invention is made in view of the problems described above, and offers a receiving apparatus, a receiving method, and a radio communications system that are capable of realizing highly accurate signal separation by reducing degradation of the receiving quality due to the multipath interference.

Means for Solving the Problem

According to an embodiment of the present invention, a receiving apparatus is provided for receiving a signal using the CDMA method, wherein signals are transmitted from M transmitting antennas (M is a positive integer), and received by N receiving antennas (N is a positive integer). The receiving apparatus includes:

multipath receiving signal demodulating units configured to demodulate (primary demodulation) the signals received by the receiving antennas, estimate the transmitted signals from the transmitting antennas, and obtain a received signal of each path of the receiving antennas in a multipath environment based on the estimation;

multipath interference canceling units configured to deduct the obtained received signals of paths other than a target path from the signals received by the receiving antennas to obtain a multipath interference cancelled signal; and a demodulator configured to perform a secondary demodulation of the multipath interference cancelled signal output by the multipath interference canceling unit.

According to an aspect of the present invention, the multipath receiving signal demodulating unit of the receiving apparatus carries out the primary demodulation using a minimum mean square error (MMSE) method.

According to an aspect of the present invention, the multipath receiving signal demodulating unit of the receiving apparatus carries out the primary demodulation using a maximum likelihood detection (MLD) method.

According to an aspect of the present invention, the multipath receiving signal demodulating unit of the receiving apparatus carries out the primary demodulation of two or more paths in one block using the maximum likelihood detection method that uses QR factorization.

According to an aspect of the present invention, the multipath receiving signal demodulating unit of the receiving apparatus carries out the primary demodulation of each of the paths using the maximum likelihood detection method that uses QR factorization.

According to an aspect of the present invention, the multipath receiving signal demodulating unit of the receiving apparatus controls the amplitude of the received signal based on the correctness likelihood of a transmission symbol sequence estimated using any one of the methods described above.

According to an aspect of the present invention, the multipath receiving signal demodulating unit of the receiving apparatus estimates a channel coefficient using a known pilot signal transmitted from the M transmitting antennas.

According to an aspect of the present invention, the receiving apparatus includes a predetermined number of multipath receiving signal demodulating units, and a predetermined number of multipath interference canceling units connected in stages (cascaded).

According to an aspect of the present invention, when the receiving apparatus includes the staged connection of the multipath receiving signal demodulating units, the estimated channel coefficient is updated in each stage based on the known pilot signal transmitted from the M transmitting antennas using the multipath interference cancelled signal.

Further, according to an aspect of the present invention, the demodulating unit of the receiving apparatus carries out the secondary demodulation using the maximum likelihood detection method.

According to an aspect of the present invention, the demodulating unit of the receiving apparatus carries out the secondary demodulation of two or more paths in one block using the maximum likelihood detection method that uses QR factorization.

According to an aspect of the present invention, the demodulating unit of the receiving apparatus carries out the secondary demodulation of each of the paths using the maximum likelihood detection method that uses QR factorization.

According to an aspect of the present invention, when code multiplexed signals are transmitted from the M transmitting antennas, the multipath receiving signal demodulating unit of the receiving apparatus carries out the primary demodulation of a signal received by each receiving antenna, and the received signal of each path for every receiving antenna is obtained for every spreading signal, the multipath interference canceling unit generates a signal by deducting the obtained signal corresponding to all the spreading signals of paths other than a target path from the signals received by each of the receiving antennas to obtain a multipath interference cancelled signal, and the demodulating unit carries out a secondary demodulation of the multipath interference cancelled signal for every spreading signal.

Effect of the Invention

According to the embodiment of the present invention, when different data are simultaneously transmitted from two or more transmitting antennas using the CDMA method, highly accurate separation of the signals transmitted from different transmitting antennas, the multipath interference of which signals is reduced, can be realized. Consequently, the receiving quality in the multipath fading environment is greatly improved.

BRIEF DESCRIPTION OF THE DRAWINGS

FIG. 8 is a block diagram of a second embodiment of the receiving apparatus according to the present invention.

FIG. 9 is a block diagram of a first embodiment of a demodulator according to the present invention.

DESCRIPTION OF THE PREFERRED EMBODIMENTS

Description of Notations

Figure 1:
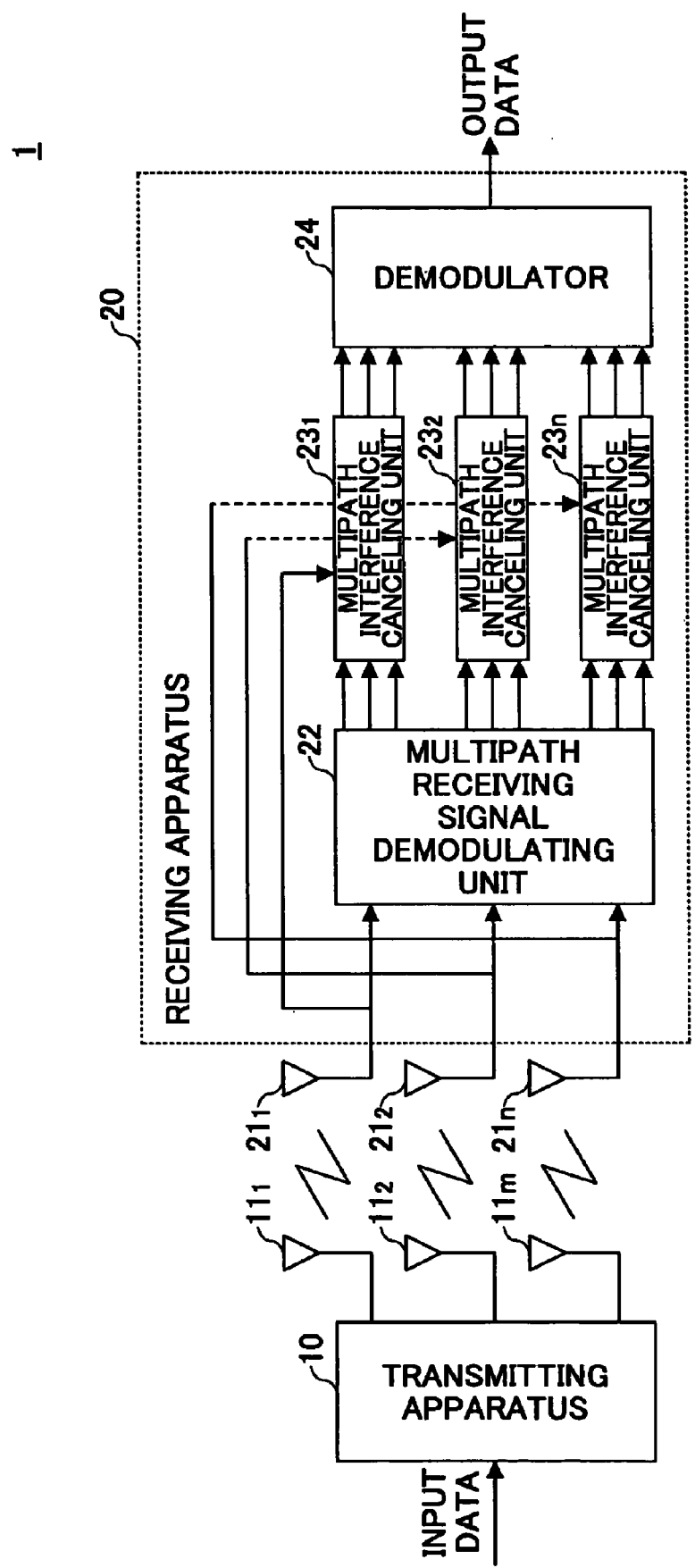
FIG. 1 is a block diagram of a radio communications system including a receiving apparatus according to an embodiment of the present invention.

1 Radio Communications System
10 1010 Transmitting apparatus
$11_1$ through $11_m$, $1011_1$ through $1011_n$ Transmitting Antenna
20, 200, 600, 1020 Receiving apparatus
$21_1$ through $21_n$, $102_1$, through $1021_n$ Receiving Antenna
22, 30 through 50, 70, 211 through 213, 611 through 614 Multipath receiving signal demodulator
23, $221_1$, $221_2$, $222_1$, $222_2$, $223_1$, $223_2$, 615 through 618 Multipath interference canceling unit
24, 300, 400, 500, 621, 622 Demodulator
31, 41, 51, 71, 100, 311, 411, 511 Channel coefficient estimating unit
32 Linear filter coefficient Calculating unit
33 Linear filter
$34_1$ through $34_m$, 42 through 45, 52 through 55, 72 through 75, 312 through 315, 412 through 415, 512 through 515 Reverse spreading unit
$35_1$ through $35_m$ Transmission symbol sequence estimating unit
$36_1$ through $36_m$, $50_1$ through $50_m$, $62_1$ through $62_m$, $84_1$ through $84_m$ Multipath receiving signal demodulator
46, 58, 80, 316, 418, 520 Transmission symbol candidate generating unit
47, 317 Received signal replica generating unit
48, 60, 82, 318, 420, 522 Likelihood calculating unit
$49_1$ through $49_m$, $61_1$ through $61_m$, $83_1$ through $83_m$ Transmission symbol sequence estimating unit
56, 76, 77, 416, 516, 517 QR factorizing unit
57, 78, 79, 417, 518, 519 $Q^H$ operating unit
59, 81, 419, 521 Conversion signal replica generating unit
101 through 104 Correlation detecting unit
111 through 114 Replicas signal generating unit
319, 421, 523 Transmitting sequence estimating unit
631 through 634, 641 through 644 Adder

BEST MODE OF CARRYING OUT THE INVENTION

Hereafter, embodiments of the present invention are described with reference to the attached drawings.

FIG. 1 is a block diagram of a radio communications system 1 including a receiving apparatus 20 according to the embodiment of the present invention. The radio communications system 1 according to the present invention uses one of a MIMO channel and a MISO (Multi Input Single Output, i.e., two or more inputs and a single output, using only one receiving antenna) channel in DS-CDMA. In the following, an example wherein a signal is transmitted using a MIMO channel is described.

As shown in FIG. 1, the radio communications system 1 includes a transmitting apparatus 10 and the receiving apparatus 20 that are connected through radio communications. The transmitting apparatus 10 carries out serial to parallel conversion of a data bit sequence that is input for transmission into M transmitting sequences, modulates the transmitting sequences (data modulation) using the same frequency band and the same spreading signal, and simultaneously transmits the modulated sequences from M transmitting antennas $11_1$ through $11_m$ as transmission signals. Each of the transmission signals is propagated through L paths (multipath), and is received by N receiving antennas $21_1$ through $21_n$ that are connected to the receiving apparatus 20. The receiving apparatus 20 includes a multipath receiving signal demodulator 22, N multipath interference canceling units $23_1$ through $23_n$, and a demodulator 24.

Here, a transmission signal from a transmitting antenna $11_m$ connected to the transmitting apparatus 10 is expressed by $S_m(t)$, and a received signal received by a receiving antenna $21_n$ connected to the receiving apparatus 20 is expressed by $r_n(t)$. Then, $r_n(t)$ can be described as follows.

$$r_n(t) = \sum_{m=1}^{M} \sum_{l=1}^{L} h_{m,n,l}(t) \cdot s_m(t - \tau_l)$$ [Expression 1]

Here, $h_{m,n,l}(t)$ is a channel coefficient of a reception path l when receiving a transmission signal from the transmitting antenna $11_m$ by the receiving antenna $21_n$, and $\tau_l$ is a propagation delay time of the reception path l.

Next, operations of the receiving apparatus 20 according to the present invention are described.

With the receiving apparatus 20, signals $r_n(t)$ received by the receiving antennas $21_1$ through $21_n$ are provided to the multipath receiving signal demodulator 22. The multipath receiving signal demodulator 22 carries out-provisional signal separation (a primary demodulation) based on the signals received by the N receiving antennas $21_1$ through $21_n$ such that received signal sequences as described by the following Expression 2 for the reception paths between the transmitting antennas $11_1$ through $11_m$ and the receiving antennas $21_1$ through $21_n$ are estimated and output.

$$\hat{i}_{m,n,l}(t)$$ [Expression 2]

An algorithm for carrying out the primary demodulation is described below.

Next, the signals received by the receiving antennas $21_1$ through $21_n$, and the received signal sequences of every reception path from the transmitting antennas $11_1$ through $11_m$ are provided to the corresponding multipath interference canceling units $23_1$ through $23_n$. The multipath interference canceling units $23_1$ through $23_n$ (that number N, the same number as the receiving antennas $21_1$ through $21_n$) obtain received signals after the multipath interference cancellation $r_{n,l}(t)$ by deducting all the received signals of other paths than a target path from the received signal according to the following expression, and output the multipath interference cancelled signals $r_{n,l}(t)$.

$$r_{n,l}(t) = r_n(t) - \sum_{m=1}^{M} \sum_{l'=1, l' \neq l}^{L} \hat{i}_{m,n,l'}(t)$$ [Expression 3]

The demodulator 24 receives N×L multipath interference cancelled signals $r_{n,l}(t)$ provided by the multipath interference canceling units $23_1$ through $23_n$. The demodulator 24 outputs a secondary demodulation result that is a likelihood $\lambda_i$, the likelihood being one of a likelihood of the transmission symbol sequence and a likelihood of a bit transmitted by the transmission symbol sequence. The secondary demodulation result is provided to an error correction (channel) decoder, such as a Viterbi decoder and a turbo decoder, for decoding.

As described above, according to the present embodiment, the multipath receiving signal demodulator 22 carries out the primary demodulation, and the transmission signals are estimated. Then, the received signal for every path is estimated by multiplying the estimated received signal and the channel fluctuation values (channel coefficients). Then, the multipath interference canceling units 23 subtract estimated received signals other than the signal received through the target path. In this way, the demodulator 24 is able to demodulate the received signal after removing multipath interference, and signal separation can be performed with high accuracy.

That is, even if the DS-CDMA method is applied to an uplink, and the MIMO multiplexing method is used, degradation of the signal separation accuracy resulting from the multipath interference can be avoided.

Figure 2:
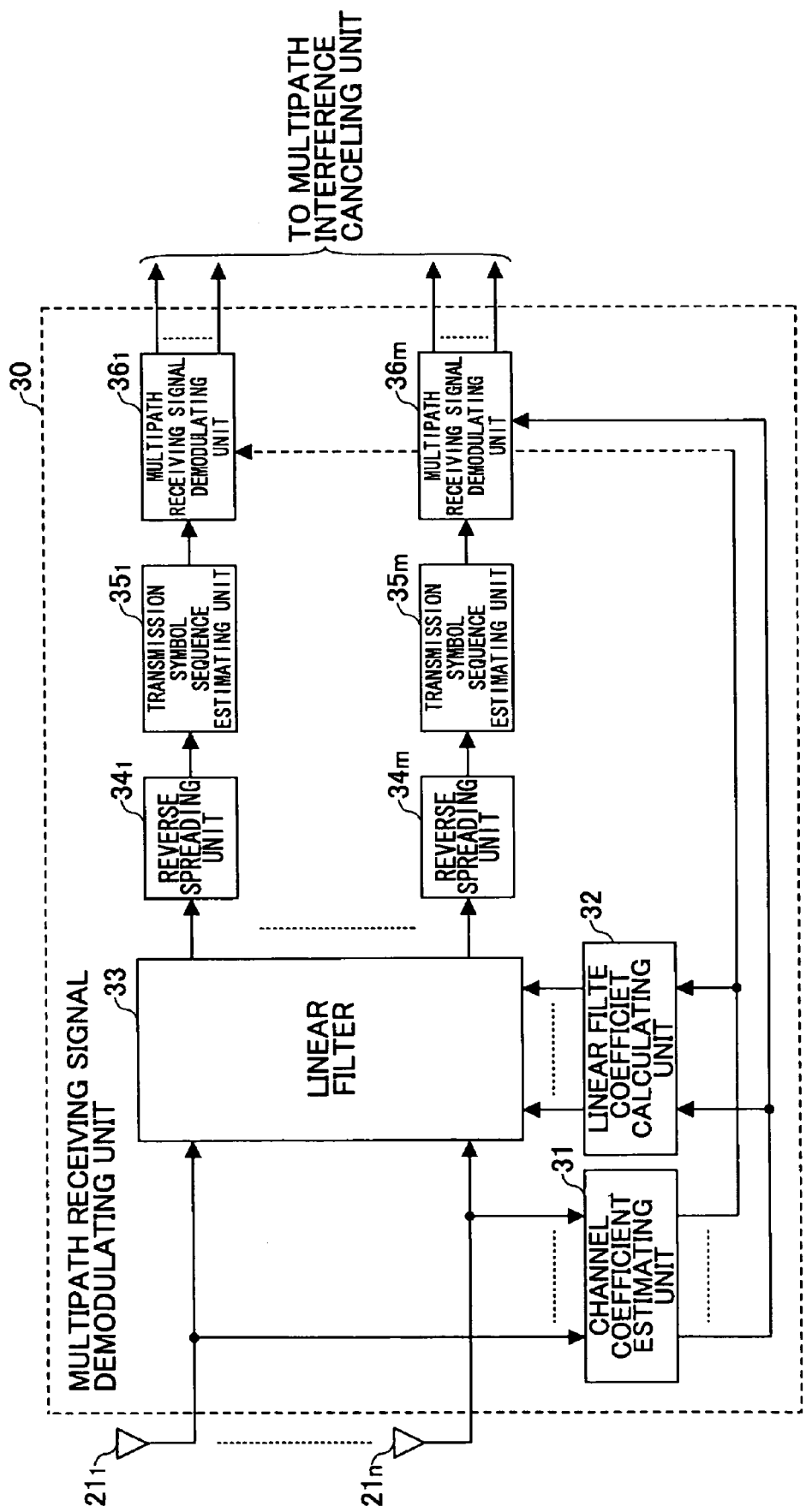
FIG. 2 is a block diagram of a first embodiment of a multipath receiving signal demodulator.

FIG. 2 is a block diagram showing a multipath receiving signal demodulator 30 according to a first embodiment of the multipath receiving signal demodulator 20 shown in FIG. 1. According to the first embodiment, the multipath receiving signal demodulator 30 uses the MMSE algorithm as the primary demodulation method.

As shown in FIG. 2, the multipath receiving signal demodulator 30 includes a channel coefficient estimating unit 31, a linear filter coefficient calculating unit 32, a linear filter 33, M reverse spreading units $34_1$ through $34_m$, M transmission symbol sequence estimating units $35_1$ through $35_m$, and M multipath receiving signal demodulators $36_1$ through $36_m$.

According to the multipath receiving signal demodulator 30 of the first embodiment, signals $r_n(t)$ received by N receiving antennas $21_1$ through $21_n$ are provided to the channel coefficient estimating unit 31, and channel coefficients $h_{m,n,l}$ of paths between the receiving antennas $21_1$ through $21_n$ and the transmitting antennas $11_1$ through $11_n$ (FIG. 1) are estimated.

Then, the linear filter coefficient calculating unit 32 calculates a coefficient for the linear filter 33, which carries out a filtering process for equalization using the linear filter coefficient. The process described above can be realized by signal processing in one of the time domain and the frequency domain; in the following, descriptions are presented about an example wherein signal processing is carried out in the frequency domain.

The linear filter coefficient calculating unit 32 calculates the linear filter coefficient that simultaneously minimizes delay path components of signals from a desired transmitting antenna and receiving signal components from other transmitting antennas using the estimated channel coefficient $\hat{h}_{m,n,l}$ as described by Expression 4.

$$\hat{h}_{m,n,l}$$ [Expression 4]

Specifically, an impulse response of a channel (channel impulse response) between the transmitting antennas $11_1$ through $11_m$ and the receiving antennas $21_1$ through $21_n$ is calculated using the estimated channel coefficient as described by Expression 5 $\hat{h}_{m,n,l}$ estimated using a pilot channel in the time domain, and a delay time of each reception path $\hat{\tau}_l$ as described by Expression 6.

$$\hat{h}_{m,n,l}$$ [Expression 5]

$$\hat{\tau}_l$$ [Expression 6]

Next, FFT for $N_f$ points is carried out on the channel impulse response obtained as described above. Here, $N_f$ is a number that is equal to a product of the number of chips equivalent to a block size that are linear-filtered, and the number of times of over-sampling. In this way, the frequency components $h_{nm}^{(f)}$ as described by Expression 7 of the channel coefficients of the transmission signals from the transmitting antennas $11_1$ through $11_m$ to the receiving antennas $21_1$ through $21_n$ are estimated.

$h_{nm}^{(f)}$ [Expression 7]

Using this, an estimated value of a channel matrix having N rows×M columns as described by Expression 9 is obtained as described by Expression 8.

$\hat{H}^{(f)} = [\hat{h}_{nm}^{(f)}] (1 \leq n \leq N, 1 \leq m \leq M)$ [Expression 8]

$\hat{H}^{(f)}$ [Expression 9]

Using Expression 10, linear filtering coefficients are calculated for every frequency component after FFT.

$\hat{H}^{(f)}$ [Expression 10]

The linear filter coefficients can be determined in accordance with one of ZF criterion and MMSE criterion.

For example, the linear filter coefficients by the ZF criterion are obtained according to the following expression.

$W^{(f)} = (\hat{H}^{(f)})^H \{\hat{H}^{(f)}(\hat{H}^{(f)})^H\}^{-1}$ [Expression 11]

Further, the linear filter coefficients by the MMSE criterion are obtained according to the following expression.

$W^{(f)} = (\hat{H}^{(f)})^H \{\hat{H}^{(f)}(\hat{H}^{(f)})^H + N^{(f)} I\}^{-1}$ [Expression 12]

Here, the last term of Expression 12 that is described by Expression 13 represents a noise component.

$N^{(f)} = (n_1^{(f)}, \ldots, n_N^{(f)})^T$ [Expression 13]

Next, the linear filter 33 converts each of N sequence received signals into a received signal $Y^{(f)}$ in the frequency domain by carrying out FFT for the $N_f$ points. Then, $Y^{(f)}$ is multiplied by $W^{(f)}$ for obtaining estimated values as described by Expression 14 of M transmission signals according to Expression 15, where both collapse of the orthogonality between code channels due to channel fluctuation in the frequency domain (MPII (Multi-Path Interference) in the time domain), and interference between the transmitting antennas are simultaneously equalized (reduced).

$\tilde{S}^{(f)} = (\tilde{S}_1^{(f)}, \ldots, \tilde{S}_M^{(f)})^T$ [Expression 14]

$\tilde{S}^{(f)} = \begin{bmatrix} \tilde{s}_1^{(f)} \\ \tilde{s}_2^{(f)} \\ \tilde{s}_3^{(f)} \\ \tilde{s}_4^{(f)} \end{bmatrix}$ [Expression 15]

$= W^{(f)} Y^{(f)}$ $= \begin{bmatrix} w_{1,1}^{(f)} & w_{1,2}^{(f)} & w_{1,3}^{(f)} & w_{1,4}^{(f)} \\ w_{2,1}^{(f)} & w_{2,2}^{(f)} & w_{2,3}^{(f)} & w_{2,4}^{(f)} \\ w_{3,1}^{(f)} & w_{3,2}^{(f)} & w_{3,3}^{(f)} & w_{3,4}^{(f)} \\ w_{4,1}^{(f)} & w_{4,2}^{(f)} & w_{4,3}^{(f)} & w_{4,4}^{(f)} \end{bmatrix} \begin{bmatrix} y_1^{(f)} \\ y_2^{(f)} \\ y_3^{(f)} \\ y_4^{(f)} \end{bmatrix}$ In addition $\tilde{S}^{(f)} = (\tilde{S}_1^{(f)}, \ldots, \tilde{S}_M^{(f)})^T$ [Expression 16]

is reconverted into every provisional demodulating signal (primary demodulation signal) $\hat{S}_m$ as described by Expression 17 in the time domain by carrying out parallel-to-serial conversion after IFFT for the $N_f$ points.

$\hat{S}_m$ [Expression 17]

The acquired provisional demodulating sequences (primary demodulation sequences) for the transmitting antennas are provided to the corresponding reverse spreading units $34_1$ through $34_m$. The reverse spreading units $34_1$ through $34_m$ carry out reverse spreading of the provisional demodulating sequences for the transmitting antennas with the same spreading signal as used at the time of transmission, and reverse-spread signals $z_m$ are output to the corresponding transmission symbol sequence estimating units $35_1$ through $35_m$. The transmission symbol sequence estimating units $35_1$ through $35_m$ carry out one of a hard decision and a soft decision of the corresponding reverse-spread signals $z_m$ such that transmission symbol sequences as described by Expression 18 are estimated and output.

$\tilde{d}_n$ [Expression 18]

The transmission symbol sequence estimating units $35_1$ through $35_m$ may carry out the hard decision as follows.

Here, a transmission symbol is expressed by $d_{m,i}$, where "i" is a symbol candidate number satisfying Expression 19 ($1 \leq i \leq C$), and C expresses the number of transmission symbol points, that is, 4 for QPSK and 16 for 16QAM.

$(1 \leq i \leq C)$ [Expression 19]

A symbol candidate number "i" that makes the transmission symbol $d_{m,i}$ closest to $z_m$ (refer to Expression 20) is determined.

$\min_i |z_m - d_{m,i}|^2$ [Expression 20]

Using the "i" determined as above, a determination of Expression 21 is made.

$\tilde{d}_m = d_{m,i}$ [Expression 21]

Alternatively, the transmission symbol sequence estimating units $35_1$ through $35_m$ may carry out the soft decision as follows.

First, a bit sequence for the soft decision is obtained according to Expression 22.

$\hat{u}_{m,i} = \tanh\left(\frac{\hat{\Lambda}_{m,i}}{2}\right)$ [Expression 22]

Here, the expression $\hat{\Lambda}_{m,i}$ shown by Expression 23 is a logarithmic likelihood ratio of a bit "i" of the signal from the transmitting antenna $11_m$.

$\hat{\Lambda}_{m,i}$ [Expression 23]

The logarithmic likelihood ratio $\hat{\Lambda}_{m,i}$ can be described by Expression 24.

$\hat{\Lambda}_{m,i} = \ln \frac{P(b_{m,i} = +1 | z_m)}{P(b_{m,i} = -1 | z_m)}$ [Expression 24]

$\approx \frac{1}{2\sigma^2(n)} \{(z_m - s_{min,-1})^2 - (z_m - s_{min,1})^2\}$

Here, $S_{min,v}$ expresses a symbol candidate having the smallest Euclidean distance from the transmission signal point $z_m$ out of a set of symbols whose i-th bit is "vv", and $\sigma^2$ is noise power.

Then, a soft decision symbol $\tilde{d}_m$ [Expression 25]

is estimated as shown by Expression 27 using the expression of Expression 26.

$$\tilde{u}_{m,i} \quad [\text{Expression 26}]$$

$$\text{Providing } \tilde{d}_m = \tilde{x}_m + j \cdot \tilde{y}_m \quad [\text{Expression 27}]$$

$$\text{In case of } QPSK \begin{cases} \tilde{x}_m = \tilde{u}_{m,1} \\ \tilde{y}_m = \tilde{u}_{m,2} \end{cases}$$

$$\text{In case of } 16QAM \begin{cases} \tilde{x}_m = \sqrt{\dfrac{1}{2.5}}\, \tilde{u}_{m,1}(2 - \tilde{u}_{m,2}) \\ \tilde{y}_m = \sqrt{\dfrac{1}{2.5}}\, \tilde{u}_{m,3}(2 - \tilde{u}_{m,4}) \end{cases}$$

Finally, the multipath receiving signal demodulators $36_1$ through $36_m$ receive the transmission symbol sequences as described by Expression 28 $\tilde{d}_m$ that are estimated as described above.

$$\tilde{d}_m \quad [\text{Expression 28}]$$

Then, the input transmission symbol sequences as described by Expression 29 $\tilde{d}_m$ are multiplied by the spreading signal and the channel coefficients such that a received signal sequence {as shown by Expression 30} $\{\hat{1}_{m,n,l}(t)\}$ for every reception path from the transmitting antennas to the receiving antennas is estimated as shown by Expression 31, and output.

$$\tilde{d}_m \quad [\text{Expression 29}]$$

$$\hat{1}_{m,n,l}(t) \quad [\text{Expression 30}]$$

$$\hat{1}_{m,n,l}(t) = \hat{h}_{m,n,l}(t) \cdot \tilde{d}_m(t) \cdot c(t - \tau_l) \quad [\text{Expression 31}]$$

Next, another embodiment of the multipath receiving signal demodulator is described.

Figure 3:
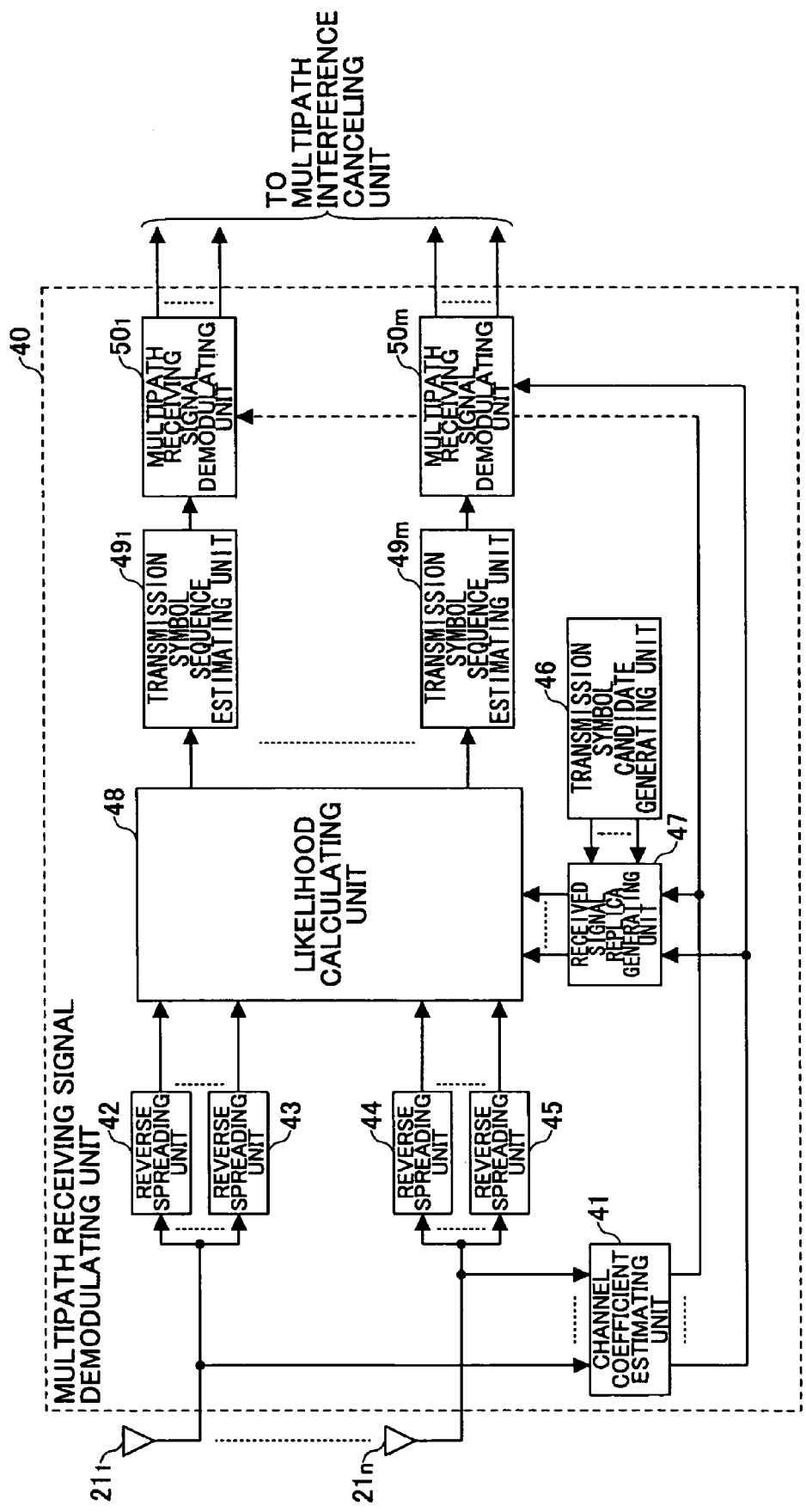
FIG. 3 is a block diagram of a second embodiment of the multipath receiving signal demodulator.

FIG. 3 is a block diagram showing a multipath receiving signal demodulator 40 that is a second embodiment of the multipath receiving signal demodulator of the present invention. According to the second embodiment, an MLD algorithm is used for the multipath receiving signal demodulator 40 as the method of the primary demodulation.

The multipath receiving signal demodulator 40 includes a channel coefficient estimating unit 41, N×L reverse spreading units 42 through 45, a transmission symbol candidate generating unit 46, a received signal replica generating unit 47, a likelihood calculating unit 48, M transmission symbol sequence estimating units $49_1$ through $49_m$, and M multipath receiving signal demodulators $50_1$ through $50_m$.

According to the multipath receiving signal demodulator 40 of the second embodiment, signals $r_n(t)$ received by the receiving antennas $21_1$ through $21_n$ are provided to the channel coefficient estimating unit 41, and the channel coefficients $h_{m,n,l}$ of the paths between the receiving antennas $21_1$ through $21_n$ and the transmitting antennas $11_1$ through $11_n$ are estimated.

Next, the reverse spreading units 42 through 45, which number N×L, perform reverse spreading of the received signals $r_n(t)$ with the same spreading signal as the spreading signal used at the time of transmission at the receiving timing of each path, and N×L reverse-spread signals $Z_{n,l}$ for the paths of the receiving antennas are obtained.

The transmission symbol candidate generating unit 46 generates and outputs transmission symbols $d_{m,i}$ corresponding to each transmitting antenna, where "i" is a symbol candidate number that suffices for Expression 32.

$$(1 \le i \le C) \quad [\text{Expression 32}]$$

where C is the number of transmission symbol points, for example, C=4 for QPSK, and C=16 for 16QAM.

The received signal replica generating unit 47 receives the transmission symbols $d_{m,i}$ generated by the transmission symbol candidate generating unit 46, and the channel coefficients estimated by the channel coefficient estimating unit 41 such that received signal replicas as described by Expression 33 are generated according to Expression 34 and output.

$$\hat{z}_{n,l,i_1,i_2,\ldots,i_M} \quad [\text{Expression 33}]$$

$$\hat{z}_{n,l,i_1,i_2,\ldots,i_M} = \hat{h}_{1,n,l} \cdot d_{1,i_1} + \hat{h}_{2,n,l} \cdot d_{2,i_2} + \ldots + \hat{h}_{M,n,l} \cdot d_{M,i_M} \quad [\text{Expression 34}]$$

The likelihood calculating unit 48 receives the reverse-spread signals $z_{n,l}$ and the received signal replicas as described by Expression 35.

$$\hat{z}_{n,l,i_1,i_2,\ldots,i_M} \quad [\text{Expression 35}]$$

Then, the likelihood calculating unit 48 calculates errors according to Expression 36.

$$e_{i_1,i_2,\ldots,i_M} = \sum_{n=1}^{N}\sum_{l=1}^{L} |z_{n,l} - \hat{z}_{n,l,i_1,i_2,\ldots,i_M}|^2 \quad [\text{Expression 36}]$$

The transmission symbol sequence estimating units $49_1$ through $49_m$ receive the generated transmission symbols corresponding to the transmitting antennas, receive the corresponding error signals, determine the minimum of the errors, and estimate transmission symbol sequences, as described by Expression 37, which give the minimum errors.

$$\tilde{d}_m \quad [\text{Expression 37}]$$

In the case where the transmission symbol sequence estimating units $49_1$ through $49_m$ carry out hard decisions, Expression 38 is used.

$$\tilde{d}_m = d_{m,im} \text{ where } i_1, i_2, \ldots i_M \text{ give minimum}$$
$$e_{i_1, i_2, \ldots, i_M} \quad [\text{Expression 38}]$$

When the transmission symbol sequence estimating units $49_1$ through $49_m$ carry out soft decisions, the following process can be used.

First, a bit sequence for soft decision is obtained according to the following expression.

$$\hat{u}_{m,i} = \tanh\left(\dfrac{\hat{\Lambda}_{m,i}}{2}\right) \quad [\text{Expression 39}]$$

Here, $$\hat{\Lambda}_{m,i} \quad [\text{Expression 40}]$$

is a logarithmic likelihood ratio of a bit "i" of a transmitting antenna $11_m$, and is expressed as follows.

$$\hat{\Lambda}_{m,i} = \ln\dfrac{P(b_{m,i} = +1 | z_{1,1}, \ldots, z_{N,L})}{P(b_{m,i} = -1 | z_{1,1}, \ldots, z_{N,L})} \quad [\text{Expression 41}]$$

$$\approx \dfrac{1}{2\sigma^2(n)}(e_{min,-1} - e_{min,1})$$

Here, $e_{min,v}$ is the minimum value of $$e_{i_1,i_2,\ldots,i_M}$$ [Expression 42]

wherein the i-th bit is "v", and $\sigma^2(n)$ expresses noise power. The soft decision symbol $$\tilde{d}_m$$ [Expression 43]

is estimated as shown by Expression 45 using the expression of Expression 44.

$$\tilde{u}_{m,i}$$ [Expression 44]

Providing $\tilde{d}_m = \tilde{x}_m + j \cdot \tilde{y}_m$ [Expression 45]

In the case of $QPSK \begin{cases} \tilde{x}_m = \tilde{u}_{m,1} \\ \tilde{y}_m = \tilde{u}_{m,2} \end{cases}$ In the case of $16QAM \begin{cases} \tilde{x}_m = \sqrt{\dfrac{1}{2.5}}\, \tilde{u}_{m,1}(2 - \tilde{u}_{m,2}) \\ \tilde{y}_m = \sqrt{\dfrac{1}{2.5}}\, \tilde{u}_{m,3}(2 - \tilde{u}_{m,4}) \end{cases}$ Finally, the multipath receiving signal demodulators $36_1$ through $36_m$ ($50_1$ through $50_m$) receive the transmission symbol sequences described by Expression 46 that are estimated as described above.

$$\tilde{d}_m$$ [Expression 46]

Then, the received transmission symbol sequences, Expression 47, are multiplied by the spreading signal and the channel coefficients.

$$\tilde{d}_m$$ [Expression 47]

In this way, the received signal sequences described by Expression 48 for every reception path of the receiving antennas from the transmitting antennas are estimated according to Expression 49, and output.

$$\hat{\mathrm{I}}_{m,n,l}(t)$$ [Expression 48]

$$\hat{\mathrm{I}}_{m,n,l}(t) = \hat{h}_{m,n,l}(t) \cdot \tilde{d}_m(t) \cdot c(t - \tau_l)$$ [Expression 49]

Figure 4:
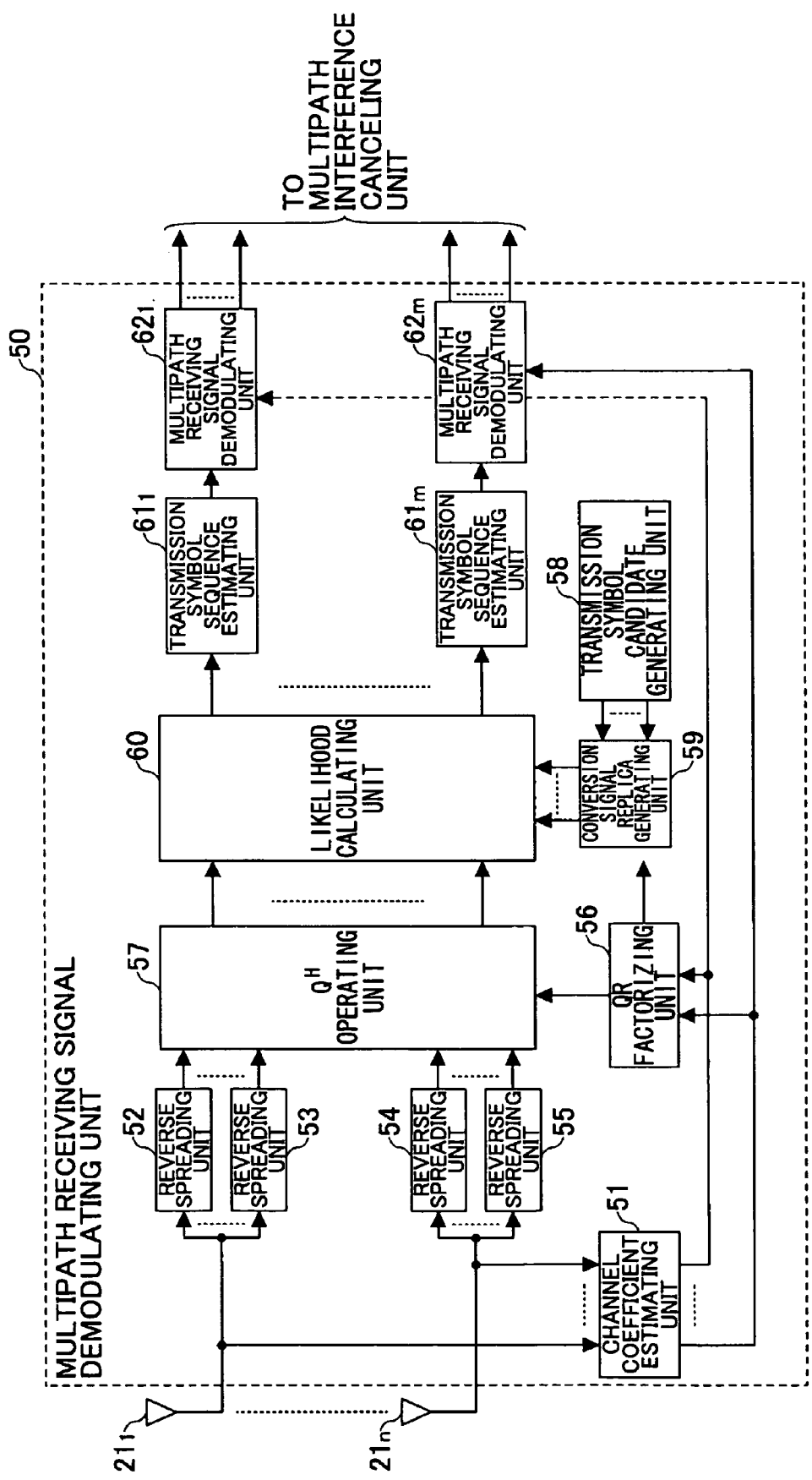
FIG. 4 is a block diagram of a third embodiment of the multipath receiving signal demodulator.

FIG. 4 is a block diagram of a multipath receiving signal demodulator 50 that is a third embodiment of the multipath receiving signal demodulator. According to the third embodiment, the MLD algorithm is used, where the multipath receiving signal demodulator 50 carries out the primary demodulation of the paths in one block.

As shown in FIG. 4, the multipath receiving signal demodulator 50 includes a channel coefficient estimating unit 51, N×L reverse spreading units 52 through 55, a QR factorizing unit 56, a $Q^H$ operating unit 57, a transmission symbol candidate generating unit 58, a conversion signal replica generating unit 59, a likelihood calculating unit 60, M transmission symbol sequence estimating units $61_1$ through $61_m$, and M multipath receiving signal demodulators $62_1$ through $62_m$.

According to the multipath receiving signal demodulator 50 of the third embodiment, the channel coefficient estimating unit 51 receives the signals $r_n(t)$ received by the receiving antennas $21_1$ through $21_n$, and the channel coefficients $h_{m,n,l}$ of the paths between the receiving antennas $21_1$ through $21_n$ and the transmitting antennas $11_1$ through $11_n$ are estimated.

Next, the reverse spreading units 52 through 55, which number N×L, perform reverse spreading of the received signals $r_n(t)$ with the same spreading signal as used at the time of transmission at the receiving timing of each path, and N×L reverse-spread signals $z_{n,l}$ of the paths of the receiving antennas are obtained.

Next, the QR factorizing unit 56 generates a channel matrix as shown by Expression 50, the channel matrix including channel coefficients expressed in N×L rows×M columns, performs QR factorization of the channel matrix, and a Q matrix and an R matrix are output.

$$\text{Channel Matrix } H = \begin{bmatrix} h_{1,1,1} & h_{2,1,1} & h_{3,1,1} & h_{4,1,1} \\ h_{1,2,1} & h_{2,2,1} & h_{3,2,1} & h_{4,2,1} \\ h_{1,3,1} & h_{2,3,1} & h_{3,3,1} & h_{4,3,1} \\ h_{1,4,1} & h_{2,4,1} & h_{3,4,1} & h_{4,4,1} \\ h_{1,1,2} & h_{2,1,2} & h_{3,1,2} & h_{4,1,2} \\ h_{1,2,2} & h_{2,2,2} & h_{3,2,2} & h_{4,2,2} \\ h_{1,3,2} & h_{2,3,2} & h_{3,3,2} & h_{4,3,2} \\ h_{1,4,2} & h_{2,4,2} & h_{3,4,2} & h_{4,4,2} \end{bmatrix}$$ [Expression 50]

(Example where M=4, N=4, L=2)

H=QR

The Q matrix output from the QR factorizing unit 56 is a unitary matrix having (N×L) rows×M columns, and suffices for $Q^H Q = I$.

Here, H expresses conjugate complex transposition, and "I" expresses a unit matrix. Further, the R matrix turns into an upper triangular matrix having M rows×M columns.

The $Q^H$ operating unit 57 performs operations according to the following expression.

$$X = \begin{bmatrix} x_1 \\ x_2 \\ x_3 \\ x_4 \end{bmatrix} = Q^H Z$$

$$= \begin{bmatrix} q^*_{1,1,1} & q^*_{1,2,1} & q^*_{1,3,1} & q^*_{1,4,1} & q^*_{1,1,2} & q^*_{1,2,2} & q^*_{1,3,2} & q^*_{1,4,2} \\ q^*_{2,1,1} & q^*_{2,2,1} & q^*_{2,3,1} & q^*_{2,4,1} & q^*_{2,1,2} & q^*_{2,2,2} & q^*_{2,3,2} & q^*_{2,4,2} \\ q^*_{3,1,1} & q^*_{3,2,1} & q^*_{3,3,1} & q^*_{3,4,1} & q^*_{3,1,2} & q^*_{3,2,2} & q^*_{3,3,2} & q^*_{3,4,2} \\ q^*_{4,1,1} & q^*_{4,2,1} & q^*_{4,3,1} & q^*_{4,4,1} & q^*_{4,1,2} & q^*_{4,2,2} & q^*_{4,3,2} & q^*_{4,4,2} \end{bmatrix} \begin{bmatrix} z_{1,1} \\ z_{2,1} \\ z_{3,1} \\ z_{4,1} \\ z_{1,2} \\ z_{2,2} \\ z_{3,2} \\ z_{4,2} \end{bmatrix}$$ [Expression 51]

-continued $$Q^H(HD+N) = Q^H(QRD+N)$$
$$= RD + Q^H N$$
$$= \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} d_1 \\ d_2 \\ d_3 \\ d_4 \end{bmatrix} + \begin{bmatrix} n'_1 \\ n'_2 \\ n'_3 \\ n'_4 \end{bmatrix}$$

Example where $M = 4$, $N = 4$, $L = 2$

The transmission symbol candidate generating unit 58 generates the transmission symbols $d_{M,i}$ for the M transmitting antennas 11, and outputs them to the conversion signal replica generating unit 59. The conversion signal replica generating unit 59 receives the transmission symbols generated by the transmission symbol candidate generating unit 58, and the R matrix provided by the QR factorizing unit 56 for generating conversion signal replicas as described by Expression 52.

$$\hat{x}_{M,i} \qquad \text{[Expression 52]}$$

The conversion signal replicas are generated according the following expression, and output.

$$\hat{x}_{M,i} = \hat{r}_{MM} \cdot d_{M,i} \qquad \text{[Expression 53]}$$

The likelihood calculating unit 60 calculates errors using $x_M$ and $\hat{x}_{M,i}$ (Expression 54) according to Expression 55.

$$\hat{x}_{M,i} \qquad \text{[Expression 54]}$$

$$e_{M,i} = |x_M - \hat{x}_{M,i}|^2 \qquad \text{[Expression 55]}$$

After performing the error calculations, the likelihood calculating unit 60 receives the generated transmission symbol sequence corresponding to the transmitting antenna $\mathbf{11}_M$, receives corresponding error signals, holds $S_M$ transmission symbols having smaller numbers of errors corresponding to the transmitting antenna $\mathbf{11}_M$ as described by Expression 56, and holds the corresponding errors as expressed by Expression 57.

$$d_{m,i(1)} \sim d_{M,i(S_M)} \qquad \text{[Expression 56]}$$

$$e_{M,i(1)} \sim e_{M,i(S_M)} \qquad \text{[Expression 57]}$$

Then, the transmission symbol candidate generating unit 58 generates a transmission symbol as described by Expression 58 for the transmitting antenna $\mathbf{11}_{M-1}$, and outputs.

$$d_{M-1,i} \qquad \text{[Expression 58]}$$

The conversion signal replica generating unit 59 receives the R matrix, the $S_M$ transmission symbol sequences corresponding to the transmitting antenna $\mathbf{11}_M$, and the transmission symbol corresponding to the transmitting antenna $\mathbf{11}_{M-1}$ for generating conversion signal replicas as described by Expression 59 according to Expression 60, and outputs the conversion signal replicas.

$$\hat{x}_{M-1,i_{M-1},i_M} \qquad \text{[Expression 59]}$$

$$\hat{x}_{M-1,i_{M-1},i_M} = \hat{r}_{(M-1)(M-1)} \cdot d_{M-1,i_{M-1}} + \hat{r}_{(M-1)M} \cdot d_{M,i_M} \qquad \text{[Expression 60]}$$

Subsequently, the likelihood calculating unit 60 performs error calculations according to the following expression.

$$e_{M-1,i_{M-1},i_M} = |x_{M-1} - \hat{x}_{M-1,i_{M-1},i_M}|^2 + e_{M,i_M} \qquad \text{[Expression 61]}$$

The likelihood calculating unit 60 holds $S_{M-1}$ combinations of the transmission symbol sequences having smaller numbers of errors corresponding to the transmitting antenna $\mathbf{11}_M$ and the transmitting antenna $\mathbf{11}_{M-1}$ as described by Expression 62.

$$\{d_{M-1,i_{M-1}(1)}, d_{M,i_M(1)}\} \sim \{d_{M-1,i_{M-1}(S_{M-1})}, d_{M,i_M(S_{M-1})}\} \qquad \text{[Expression 62]}$$

The likelihood calculating unit 60 holds errors at that time as described by Expression 63.

$$e_{M-1,i_{M-1}(1),i_M(1)} \sim e_{M-1,i_{M-1}(S_{M-1}),i_M(S_{M-1})} \qquad \text{[Expression 63]}$$

Similarly, the transmission symbol candidate generating unit 58 generates and outputs the transmission symbols $d_{m,i}$ corresponding to the transmitting antenna $\mathbf{11}_m$. The conversion signal replica generating unit 59 receives the R matrix, the transmission symbol corresponding to the transmitting antenna $\mathbf{11}_m$, and $S_{m+1}$ transmission symbol sequences corresponding to the transmitting antennas from $\mathbf{11}_{m+1}$ to $\mathbf{11}_M$ for generating conversion signal replicas as described by Expression 64 according to Expression 65; and outputs the conversion signal replicas.

$$\hat{x}_{m,i_m,i_{m+1},\ldots,i_M} \qquad \text{[Expression 64]}$$

$$\hat{x}_{m,i_m,i_{m+1},\ldots,i_M} = \hat{r}_{mm} \cdot d_{m,i_m} + \hat{r}_{m(m+1)} \cdot d_{m,i_{m+1}} + \ldots + \hat{r}_{mM} \cdot d_{m,i_M} \qquad \text{[Expression 65]}$$

The likelihood calculating unit 60 performs error calculations according to the following expression.

$$e_{m,i_m,\ldots,i_{M-1},i_M} = |x_m - \hat{x}_{m,i_m,i_{m+1},\ldots,i_M}|^2 + e_{m+1,i_{m+1},i_{m+2},\ldots,i_M} \qquad \text{[Expression 66]}$$

The likelihood calculating unit 60 holds $S_m$ combinations of the transmission symbol sequences corresponding to the transmitting antennas from $\mathbf{11}_m$ to $\mathbf{11}_M$ as described by Expression 67, the combinations having smaller numbers of errors.

$$\{d_{m,i_{m(1)}}, d_{m+1,i_{m+1(1)}}, \ldots, d_{M,i_{M(1)}}\} \sim \qquad \text{[Expression 67]}$$
$$\{d_{m,i_{m(S_m)}}, d_{m+1,i_{m+1(S_m)}}, \ldots, d_{M,i_{M(S_m)}}\}$$

Further, the likelihood calculating unit 60 holds the errors at that time as described by Expression 68.

$$e_{m,i_m(1),i_{m+1}(1), \ldots, i_M(1)} \sim e_{m,i_m(S_m),i_{m+1}(S_m), \ldots, i_M(S_m)}$$ [Expression 68]

By repeating the operations described above, C×S$_2$ combinations as described by Expression 69 of the transmission symbol sequences corresponding to all the transmitting antennas are obtained.

$$\{d_{1,i_1(j)}, d_{2,i_2(j)}, \ldots, d_{M,i_M(j)}\}$$ [Expression 69]

Further by repeating the operations described above, the errors at that time as described by Expression 70 are obtained.

$$e_{m,i_1(j),i_2(j), \ldots, i_M(j)}$$ [Expression 70]

Here, j is an integer equal to 1 or greater up to C×S$_2$.

The transmission symbol sequence estimating units 61$_1$ through 61$_m$ receive surviving transmission symbols of the corresponding transmitting antennas, receive corresponding error signals, determine minimum errors, and estimate transmission symbol sequences that give the determined minimum errors.

When the transmission symbol sequence estimating units 61$_1$ through 61$_m$ carry out hard decisions, they are performed as follows.

$$\hat{d}_m = d_{m,i_m(j)} \text{ where } i_1(j), i_2(j), \ldots, i_M(j) \text{ provide minimum of } e_{m,i_1(j),i_2(j), \ldots, i_M(j)}$$ [Expression 71]

When the transmission symbol sequence estimating units 61$_1$ through 61$_m$ carry out soft decisions, they are performed as follows.

First, a bit sequence of soft decision is obtained according to the following expression.

$$\hat{u}_{m,i} = \tanh\left(\frac{\hat{\Lambda}_{m,i}}{2}\right)$$ [Expression 72]

Here, $$\hat{\Lambda}_{m,i}$$ [Expression 73]

is a logarithmic likelihood ratio of a bit "i" of the transmitting antenna 11$_m$, and is expressed as follows.

$$\hat{\Lambda}_{m,i} = \ln \frac{P(b_{m,i} = +1 \mid z_{1,1}, \ldots, z_{N,L})}{P(b_{m,i} = -1 \mid z_{1,1}, \ldots, z_{N,L})}$$ [Expression 74]

$$\approx \frac{1}{2\sigma^2(n)}(e_{min,-1} - e_{min,1})$$

Here, $e_{min,v}$ is the smallest of $$e_{m,i_1(j),i_2(j), \ldots, i_M(j)}$$ [Expression 75]

where the i-th bit is "v", and $\sigma_2(n)$ is noise power.

The soft decision symbol $$\tilde{d}_m$$ [Expression 76]

is estimated as shown by Expression 78, using Expression 77.

$$\tilde{u}_{m,i}$$ [Expression 77]

Providing $\tilde{d}_m = \tilde{x}_m + j \cdot \tilde{y}_m$ [Expression 78]

In case of QPSK $\begin{cases} \tilde{x}_m = \tilde{u}_{m,1} \\ \tilde{y}_m = \tilde{u}_{m,2} \end{cases}$ -continued In case of 16QAM $\begin{cases} \tilde{x}_m = \sqrt{\frac{1}{2.5}} \tilde{u}_{m,1}(2 - \tilde{u}_{m,2}) \\ \tilde{y}_m = \sqrt{\frac{1}{2.5}} \tilde{u}_{m,3}(2 - \tilde{u}_{m,4}) \end{cases}$ Finally, the multipath receiving signal demodulators 62$_1$ through 62$_m$ receive the transmission symbol sequences that are estimated as described above, the transmission symbol sequences being described by Expression 79.

$$\tilde{d}_m$$ [Expression 79]

Then, the multipath receiving signal demodulators 62$_1$ through 62$_m$ multiply the received transmission symbol sequence as described by Expression 80, the spreading signal, and the channel coefficients as shown by Expression 82 such that received signal sequences, as described by Expression 81, for every reception path between the transmitting antennas and the receiving antennas are estimated and output.

$$\tilde{d}_m$$ [Expression 80]

$$\hat{I}_{m,n,l}(t)$$ [Expression 81]

$$\hat{I}_{m,n,l}(t) = \hat{h}_{m,n,l}(t) \cdot \tilde{d}_m(t) \cdot c(t - \tau_l)$$ [Expression 82]

According to the multipath receiving signal demodulator 50, the number of times of error calculations is greatly reduced to $$C + \sum_{m=1}^{M-1} CS_{m+1}$$

as described by Expression 83 in comparison with $C^M$ times required of the multipath receiving signal demodulator 40 that is shown by FIG. 3, although some degradation in demodulating the received signal sequence has to be tolerated.

$$C + \sum_{m=1}^{M-1} CS_{m+1}$$ [Expression 83]

Accordingly, complexity of the receiving apparatus is greatly reduced.

Figure 5:
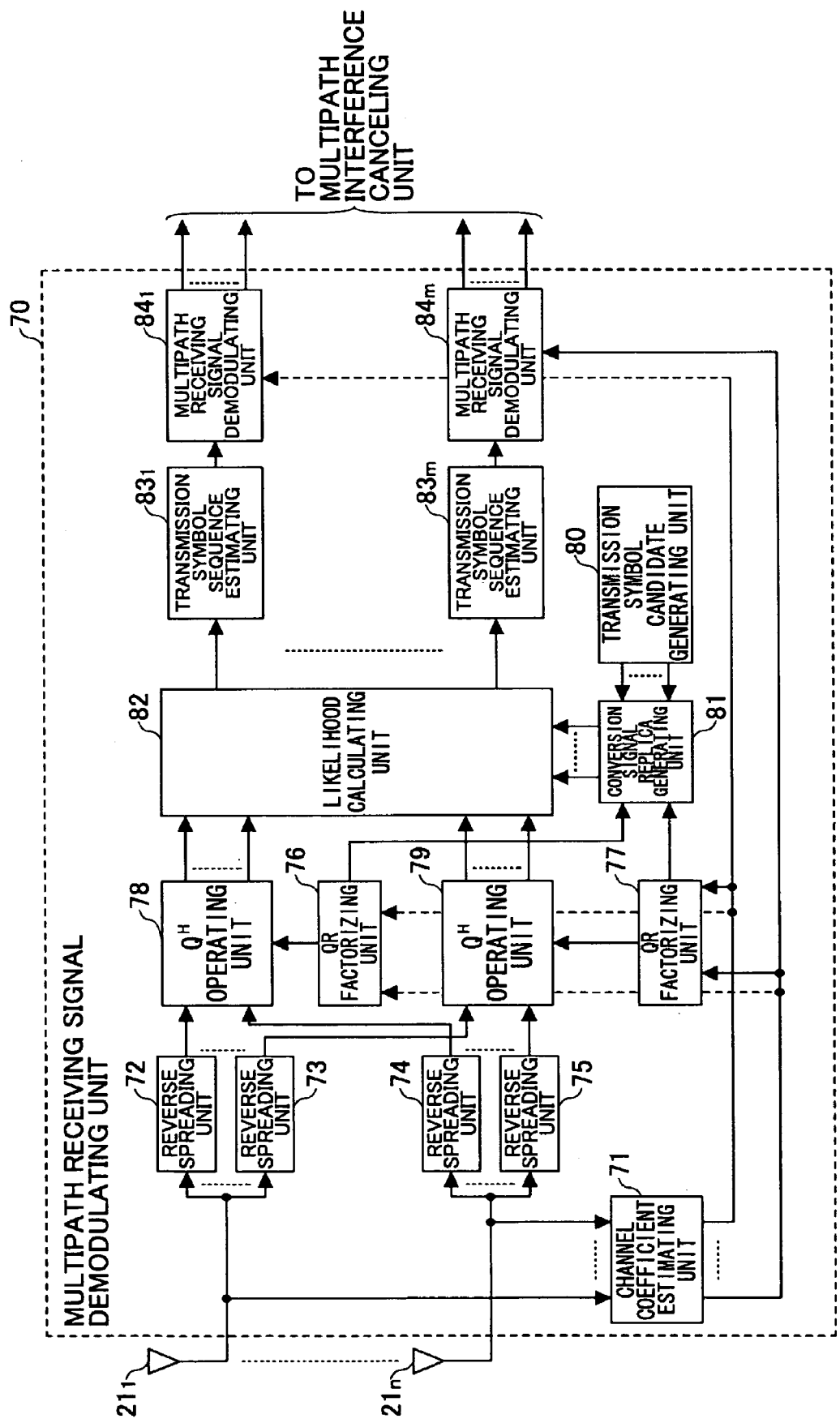
FIG. 5 is a block diagram of a fourth embodiment of the multipath receiving signal demodulator.

FIG. 5 is a block diagram showing a multipath receiving signal demodulator 70 that is a fourth embodiment of the multipath receiving signal demodulator. According to the fourth embodiment, the multipath receiving signal demodulator uses the MLD algorithm as the primary demodulation method, wherein each path is individually processed.

The multipath receiving signal demodulator 70 includes a channel coefficient estimating unit 71, N×L reverse spreading units 72 through 75, L sets of QR factorizing units 76 and 77, L sets of $Q^H$ operating units 78 and 79, a transmission symbol candidate generating unit 80, a conversion signal replica generating unit 81, a likelihood calculating unit 82, M transmission symbol sequence estimating units 83$_1$ through 83$_m$, and M multipath receiving signal demodulators 84$_1$ through 84$_m$.

According to the multipath receiving signal demodulator 70 of the fourth embodiment, the channel coefficient estimating unit 71 receives a signal $r_n(t)$ received by the N receiving antennas 21$_1$ through 21$_n$, and estimates the channel coefficients $h_{m,n,l}$ of each path between the receiving antennas $21_1$ through $21_n$ and the transmitting antennas $11_1$ through $11_m$.

Next, the reverse spreading units 72 through 75, which number N×L, perform reverse spreading of the received signal $r_n(t)$ with the same spreading signal as used at the time of transmission at the receiving timing of each path, and N×L reverse-spread signals $Z_{n,l}$ one for each path of the receiving antennas are obtained.

Next, an l-th QR factorizing unit generates channel matrices that include channel coefficients of the l-th path, the number of the channel matrices being equal to the number of the paths, and QR factorization of the channel matrices is performed such that a Q matrix and a R matrix are output.

$$\text{Channel Matrix } H_l = \begin{bmatrix} h_{1,1,l} & h_{2,1,l} & h_{3,1,l} & h_{4,1,l} \\ h_{1,2,l} & h_{2,2,l} & h_{3,2,l} & h_{4,2,l} \\ h_{1,3,l} & h_{2,3,l} & h_{3,3,l} & h_{4,3,l} \\ h_{1,4,l} & h_{2,4,l} & h_{3,4,l} & h_{4,4,l} \end{bmatrix}$$ [Expression 84]

(where $M = 4, N = 4$)

$H_l = Q_l R_l$

A $Q_l$ matrix output from the QR factorizing unit is a unitary matrix having N rows×M columns, and suffices for $Q_l^H Q_l = I$. Further, a $R_l$ matrix is an upper triangular matrix having M rows×M columns.

Accordingly, an operation carried out by the l-th $Q^H$ operating unit can be described by Expression 85.

$$X_l = \begin{bmatrix} x_1 \\ x_2 \\ x_3 \\ x_4 \end{bmatrix}$$ [Expression 85]

$$= Q_l^H Z_l$$

$$= \begin{bmatrix} q^*_{1,1,l} & q^*_{1,2,l} & q^*_{1,3,l} & q^*_{1,4,l} \\ q^*_{2,1,l} & q^*_{2,2,l} & q^*_{2,3,l} & q^*_{2,4,l} \\ q^*_{3,1,l} & q^*_{3,2,l} & q^*_{3,3,l} & q^*_{3,4,l} \\ q^*_{4,1,l} & q^*_{4,2,l} & q^*_{4,3,l} & q^*_{4,4,l} \end{bmatrix} \begin{bmatrix} z_{1,l} \\ z_{2,l} \\ z_{3,l} \\ z_{4,l} \end{bmatrix}$$

$$Q_l^H(H_l D + N) = Q_l^H(Q_l R_l D + N)$$
$$= R_l D + Q_l^H N$$

$$= \begin{bmatrix} r_{11,l} & r_{12,l} & r_{13,l} & r_{14,l} \\ 0 & r_{22,l} & r_{23,l} & r_{24,l} \\ 0 & 0 & r_{33,l} & r_{34,l} \\ 0 & 0 & 0 & r_{44,l} \end{bmatrix} \begin{bmatrix} d_1 \\ d_2 \\ d_3 \\ d_4 \end{bmatrix} + \begin{bmatrix} n'_{1,l} \\ n'_{2,l} \\ n'_{3,l} \\ n'_{4,l} \end{bmatrix}$$

where $M = 4, N = 4$

The transmission symbol candidate generating unit 80 generates the transmission symbols $d_{M,i}$ corresponding to the transmitting antenna $11_M$, and outputs them to the conversion signal replica generating unit 81. The conversion signal replica generating unit 81 receives the transmission symbols $d_{M,i}$, receives the $R_l$ matrix, and generates conversion signal replicas as described by Expression 86 according to Expression 87, and output the conversion signal replicas.

$\hat{x}_{M,l}$ [Expression 86]

$\hat{x}_{M,l,i} = r_{MM,l} \cdot d_{M,i}$ [Expression 87]

The likelihood calculating unit 82 calculates errors according to Expression 89 using $x_{M,l}$ and $\hat{x}_{M,l,i}$ (Expression 88).

$\hat{x}_{M,l,l}$ [Expression 88]

$$e_{M,i} = \sum_{l=1}^{L} |x_{m,l} - \hat{x}_{M,l,i}|^2$$ [Expression 89]

After performing the error calculation, the likelihood calculating unit 82 receives the generated transmission symbol sequences corresponding to the transmitting-antenna $11_M$, and the corresponding error signals. Then, the likelihood calculating unit 82 holds $S_M$ transmission symbols as described by Expression 90 having smaller numbers of errors corresponding to the transmitting antenna $11_M$.

$d_{M,i(1)} \sim d_{M,i(S_M)}$ [Expression 90]

Further, the likelihood calculating unit 82 holds errors at that time as described by Expression 91.

$e_{M,i(1)} \sim e_{M,i(S_M)}$ [Expression 91]

Next, the transmission symbol candidate generating unit 80 generates a transmission symbol as described by Expression 92 corresponding to the transmitting antenna $11_{M-1}$ and outputs the transmission symbol.

$d_{M-1,i}$ [Expression 92]

The conversion signal replica generating unit 81 receives the R matrix, the $S_M$ transmission symbol sequences corresponding to the transmitting antenna $11_M$, and the transmission symbol corresponding to the transmitting antenna $11_{M-1}$ for generating conversion signal replicas as described by Expression 93, according to Expression 94, and outputs the conversion signal replicas.

$\hat{x}_{M-1,l,i_{M-1},i_M}$ [Expression 93]

$\hat{x}_{M-1,l,i_{M-1},i_M} = r_{(M-1)(M-1),l} \cdot d_{M-1,i_{M-1}} + r_{(M-1)M,l} \cdot d_{M,i_M}$ [Expression 94]

Subsequently, the likelihood calculating unit 82 performs error calculations by the following expression.

$$e_{M-1,i_{M-1},i_M} = \sum_{l=1}^{L} |x_{M-1} - \hat{x}_{M-1,i_{M-1},i_M}|^2 + e_{M,i_M}$$ [Expression 95]

Then, the likelihood calculating unit 82 holds $S_{M-1}$ combinations as described by Expression 96 of the transmission symbol sequences corresponding to the transmitting antenna $11_M$ and the transmitting antenna $11_{M-1}$, the combinations having smaller numbers of errors.

[Expression 96]

$\{d_{M-1,i_{M-1}(1)}, d_{M,i_M(1)}\} \sim \{d_{M-1,i_{M-1}(S_{M-1})}, d_{M,i_M(S_{M-1})}\}$ [Expression 96]

Further, the likelihood calculating unit 82 holds the errors at that time as described by Expression 97.

$e_{M-1,i_{M-1}(1),i_M(1)} \sim e_{M-1,i_{M-1}(S_{M-1}),i_M(S_{M-1})}$ [Expression 97]

Similarly, the transmission symbol candidate generating unit 80 generates and outputs the transmission symbols $d_{m,i}$ to the transmitting antenna $11_m$. The conversion signal replica generating unit 81 receives the R matrix,
the transmission symbol corresponding to the transmitting antenna $11_m$, and
$S_{m+1}$ transmission symbol sequences corresponding to the transmitting antennas from $11_{m+1}$ to $11_M$.

Then, the conversion signal replica generating unit 81 generates conversion signal replicas as described by Expression 98 according to Expression 99.

$$\hat{x}_{m,i_m,i_{m+1},\ldots,i_M} \qquad \text{[Expression 98]}$$

$$\hat{x}_{m,i_m,i_{m+1},\ldots,i_M} = \qquad \text{[Expression 99]}$$
$$\hat{r}_{mm,l} \cdot d_{m,i_m} + \hat{r}_{m(m+1),l} \cdot d_{m,i_{m+1}} + \ldots + \hat{r}_{mM,l} \cdot d_{m,i_M}$$

The likelihood calculating unit 82 performs error calculations according to the following expression.

$$e_{m,i_m,\ldots,i_{M-1},i_M} = \qquad \text{[Expression 100]}$$
$$\sum_{i=1}^{L} |x_{m,l} - \hat{x}_{m,l,i_m,j_{m+1},\ldots,i_M}|^2 + e_{m+1,i_{m+1},j_{m+2},\ldots,i_M}$$

The likelihood calculating unit 82 holds $S_m$ combinations as described by Formula 101 of the transmission symbol sequences corresponding to the transmitting antennas from $11_m$ to $11_M$, the combinations having smaller numbers of errors.

$$\{d_{m,i_{m(1)}}, d_{m+1,i_{m+1(1)}},\ldots,d_{M,i_{M(1)}}\} \sim \qquad \text{[Expression 101]}$$
$$\{d_{m,i_{m(S_m)}}, d_{m+1,i_{m+1(S_m)}},\ldots,d_{M,i_{M(S_m)}}\}$$

Further, the likelihood calculating unit 82 holds the errors at that time as described by Expression 102.

$$e_{m,i_m(1),i_{m+1}(1),\ldots,i_M(1)} \sim e_{m,i_m(S_m),i_{m+1}(S_m),\ldots,i_M(S_M)} \qquad \text{[Expression 102]}$$

By repeating the calculations described above, $C \times S_2$ combinations as described by Expression 103 of the transmission symbol sequences corresponding to all the transmitting antennas are obtained.

$$\{d_{1,i_1,(j)}, d_{2,i_2(j)},\ldots,d_{M,i_M(j)}\} \qquad \text{[Expression 103]}$$

Further, by repeating the calculations described above, the errors at that time as described by Expressing 104 are obtained.

$$e_{m,i_1(j),i_2(j),\ldots,i_M(j)} \qquad \text{[Expression 104]}$$

where j is an integer equal to or greater than 1 up to $C \times S_2$.

The transmission symbol sequence estimating units $83_1$ through $83_m$ receive surviving transmission symbols and the corresponding error signals corresponding to each transmitting antenna, determine minimum errors, and estimate transmission symbol sequences that give the minimum errors.

When the transmission symbol sequence estimating units $83_1$ through $83_m$ carry out hard decisions, they are made as follows.

$$\hat{d}_m = d_{m,i_m(j)} \text{ where } i_1(j), i_2(j), \ldots, i_M(j) \text{ provide minimum } e_{m,i_1(j),i_2(j),\ldots,i_M(j)} \qquad \text{[Expression 105]}$$

When the transmission symbol sequence estimating units $83_1$ through $83_m$ carry out soft decisions, they are made as follows. First, a bit sequence of soft decision is obtained according to the following expression.

$$\hat{u}_{m,i} = \tanh\left(\frac{\hat{\Lambda}_{m,i}}{2}\right) \qquad \text{[Expression 106]}$$

Here, $$\hat{\Lambda}_{m,i} \qquad \text{[Expression 107]}$$

is a logarithmic likelihood ratio of the bit "i" of the transmitting antenna $11_m$, and is described as follows.

$$\hat{\Lambda}_{m,i} = \ln \frac{P(b_{m,i} = +1 \mid z_{1,1},\ldots,z_{N,L})}{P(b_{m,i} = -1 \mid z_{1,1},\ldots,z_{N,L})} \qquad \text{[Expression 108]}$$
$$\approx \frac{1}{2\sigma^2(n)}(e_{min,-1} - e_{min,1})$$

where $e_{min,v}$ is the minimum of Expression 109, $$e_{m,i_1(j),i_2(j),\ldots,i_M(j)}, \qquad \text{[Expression 109]}$$

and $\sigma^2(n)$ expresses noise power.

The soft decision symbol as described by Expression 110 is estimated as described by Expression 112 using Expression 111.

$$\tilde{d}_m \qquad \text{[Expression 110]}$$

$$\tilde{u}_{m,i} \qquad \text{[Expression 111]}$$

Providing $\tilde{d}_m = \tilde{x}_m + j \cdot \tilde{y}_m$ [Expression 112]

In the case of $QPSK \begin{cases} \tilde{x}_m = \tilde{u}_{m,1} \\ \tilde{y}_m = \tilde{u}_{m,2} \end{cases}$ In the case of $16QAM \begin{cases} \tilde{x}_m = \sqrt{\dfrac{1}{2.5}}\, \tilde{u}_{m,1}(2 - \tilde{u}_{m,2}) \\ \tilde{y}_m = \sqrt{\dfrac{1}{2.5}}\, \tilde{u}_{m,3}(2 - \tilde{u}_{m,4}) \end{cases}$ Finally, the multipath receiving signal demodulators $84_1$ through $84_m$ receive the transmission symbol sequences as described by Expression 113, the transmission symbol sequences being estimated as described above.

$$\tilde{d}_m \qquad \text{[Expression 113]}$$

The transmission symbol sequences as described by Expression 114 are multiplied by the spreading signal and the channel coefficients so that received signal sequences as described by Expression 115 are obtained for every reception path from each transmitting antenna to every receiving antenna are obtained as described by Expression 116, and the received signal sequences are output.

$$\tilde{d}_m \qquad \text{[Expression 114]}$$

$$\hat{I}_{m,n,l}(t) \qquad \text{[Expression 115]}$$

$$\hat{I}_{m,n,l}(t) = \hat{h}_{m,n,l}(t) \cdot \tilde{d}_m(t) \cdot c(t - \tau_l) \qquad \text{[Expression 116]}$$

According to the multipath receiving signal demodulator 70, similar to the case with the multipath receiving signal modulator 50 shown by FIG. 4, the number of times of error calculations is greatly reduced to $$C + \sum_{m=1}^{M-1} CS_{m+1}$$

as described by Expression 117 in comparison with $C^M$ times required of the multipath receiving signal demodulator 40 that is shown by FIG. 3, although some degradation in demodulating the received signal sequence has to be tolerated.

$$C + \sum_{m=1}^{M-1} CS_{m+1} \qquad \text{[Expression 117]}$$

Figure 6:
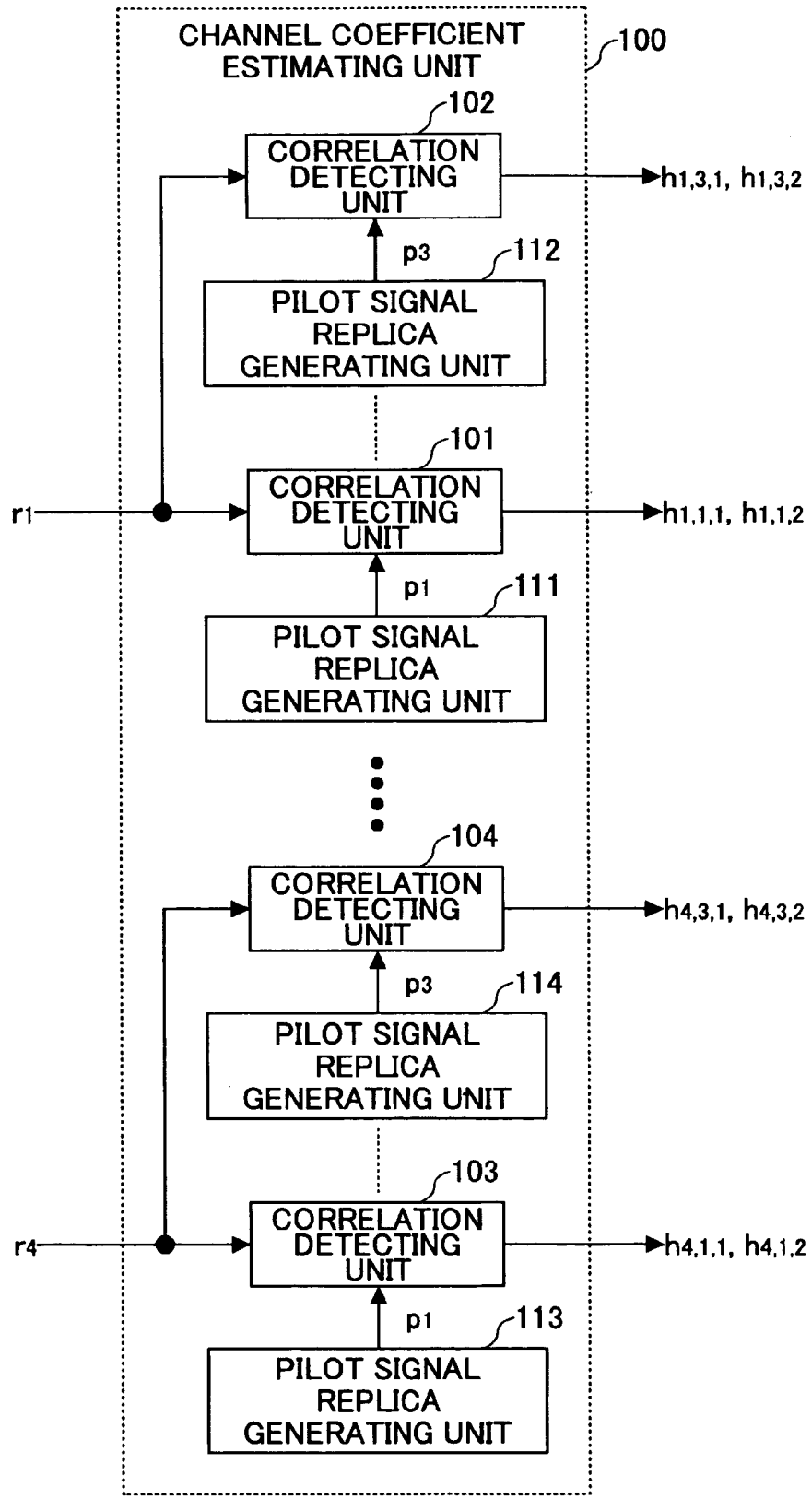
FIG. 6 is a block diagram of a channel coefficient estimating unit.
Figure 7A:
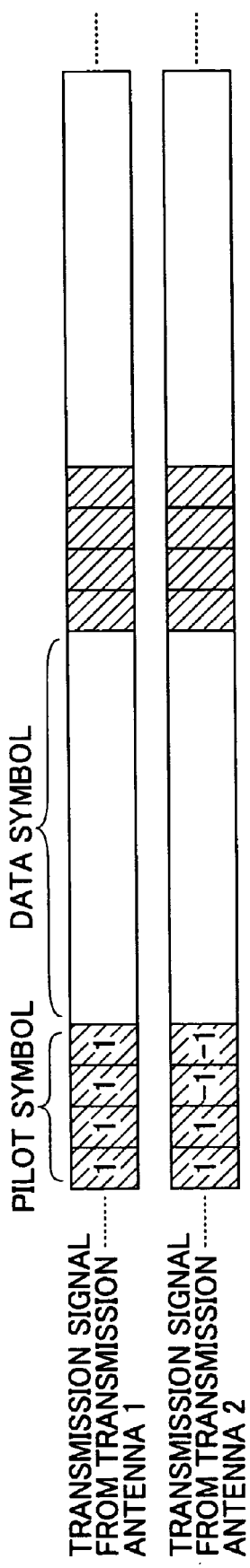
FIG. 7A is a data map showing an example of a frame structure of a signal transmitted from a transmitting apparatus.
Figure 7B:
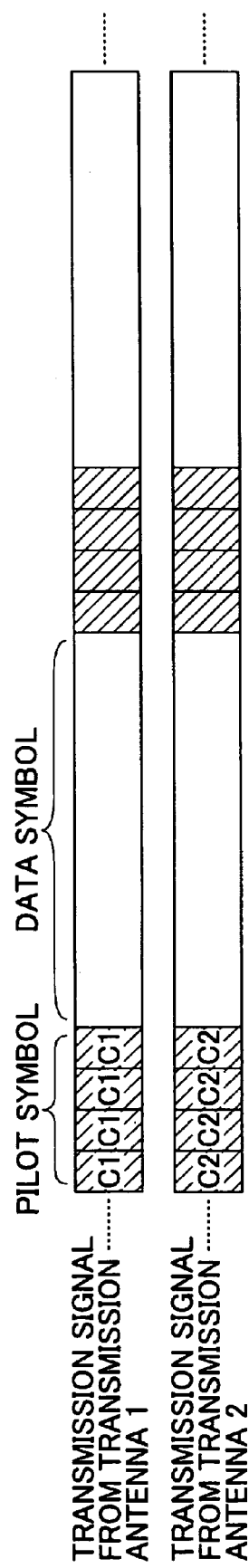
FIG. 7B is a data map showing another example of the frame structure of the signal transmitted from the transmitting apparatus.

FIG. 6 is a block diagram of the channel coefficient estimating unit according to an embodiment of the present invention. FIGS. 7A and 7B show frame structure examples of the signal transmitted from the transmitting apparatus when the channel coefficient estimating unit is used.

First, the signal transmitted from the transmitting apparatus is described referring to FIGS. 7A and 7B. According to the present embodiment, pilot symbols (indicated by hashed lines), each being 4 symbols long, and each being different, are periodically inserted into data symbols of the signals transmitted from the transmitting antennas (e.g., transmitting antennas 1 and 2). In the example shown by FIG. 7A, pilot symbol patterns for the transmitting antennas are orthogonally arranged.

Further, in the example shown by FIG. 7B, spreading signals (C1, C2) used for spreading the pilot symbols for the transmitting antennas are orthogonally arranged.

By orthogonally arranging the pilot signals between the transmitting antennas using one of the methods shown by FIGS. 7A and 7B, highly accurate channel estimation is attained. The orthogonal symbol patterns and the orthogonal spreading signals can be generated by using a Walsh sequence of the same length, for example, as the number of the pilot symbols, and the same length as the spreading signals for the pilot symbols. In the following description, a pilot signal sequence of a transmitting antenna m is expressed by $p_m(n)$, where n is a chip number.

With reference to FIG. 6, the configuration of a channel coefficient estimating unit 100 according to the present embodiment is described. The channel coefficient estimating unit 100 is for estimating a channel coefficient of each path between the transmitting antenna m and a receiving antenna n. Here, an example is shown wherein the channel coefficient estimating unit 100 is for 3 transmitting antennas and 4 receiving antennas. That is, the channel coefficient estimating unit 100 includes 3×4 correlation detecting units 101 through 104, and pilot signal replica generating units 111 through 114. In addition, in this example, each of the correlation detecting units and the pilot signal replica generating units includes two or more components, which may be identified by a suffixed serial number when necessary.

First, operations of estimating a channel coefficient $h_{1,1,1}$ between the transmitting antenna 1 and the receiving antenna 1 are described with reference to FIG. 6.

A signal r1 is received by the receiving antenna 1, and is provided to the correlation detecting unit 101. Further, the pilot signal replica generating unit 111 generates a pilot symbol sequence p1 corresponding to the transmitting antenna 1, which p1 is provided to the correlation detecting unit 101.

The correlation detecting unit 101 estimates the channel coefficient $h_{1,1,1}$ between the transmitting antenna 1 and the receiving antenna 1 according to Expression 118, wherein the received signal r1 is multiplied by a complex-conjugate value of the pilot symbol sequence p1 of the transmitting antenna 1 in consideration of the receiving timing of a path l, and the obtained product is averaged over the 4 pilot symbol periods.

$$h_{1,1,l} = \frac{1}{4}\sum_{n=1}^{4} r_1(n+\tau_l) * p_1(n)^* \qquad \text{[Expression 118]}$$

Here, $r_1(n)$ represents the received signal $r_1$ when a pilot symbol n is received. An implementation is possible wherein $h_{1,1,1}$ is estimated by weight-averaging channel coefficients obtained in two or more pilot symbol periods.

Similarly, a second step correlation detecting unit 102 receives the signal r1, and a pilot symbol sequence $p_3$ of the transmitting antenna 3 generated by a second step pilot symbol replica generating unit 112, and a channel coefficient $h_{1,3,l}$ is estimated and output.

Further, a received signal r4 and the pilot symbol sequence $p_1$ of the transmitting antenna 1 generated by the pilot symbol replica generating unit 113 are provided to the correlation detecting unit 103, and correlation is obtained such that a channel coefficient $h_{4,1,1}$ is estimated and output.

By repeating the above operation, the channel coefficient of all the paths between the 3 transmitting antenna and the 4 receiving antennas are estimated. According to the example described above, the pilot symbol is multiplexed by the data symbol in the time domain; nevertheless, the channel coefficient estimation can be obtained by the same method in the case where code multiplexing is employed.

FIG. 8 is a block diagram of a receiving apparatus 200 that is a second embodiment of the receiving apparatus of the present invention. As shown in FIG. 8, the receiving apparatus 200 includes multipath receiving signal demodulators 211 through 213 that are serially connected through multipath interference canceling units $221_1$, $221_2$, $222_1$, $222_2$, $223_1$, and $223_2$ (i.e., this example is a 3-stage configuration), and a demodulator 231 that is arranged at the last stage. To the multipath receiving signal demodulator 211, serving as the first stage, any one of the multipath receiving signal demodulators described with reference to FIGS. 2 through 5 can be applied.

Further, any one of the multipath receiving signal demodulators described with reference to FIGS. 2 through 5 can be applied to the multipath receiving signal demodulators 212, 213, and so on, as applicable. Here, signals that are input to the p-th multipath receiving signal demodulator (p is an integer equal to 2 or greater) are described by Expression 119.

$$r_{n,l}^{(p)}(t) \qquad \text{[Expression 119]}$$

This can be described as Expression 121, using the received signals, and output signals (Expression 120) of the (p−1)-th multipath receiving signal demodulator.

$$\hat{i}_{m,n,l}^{(p-1)}(t) \qquad \text{[Expression 120]}$$

Specifically, the signals that are input to the p-th multipath receiving signal demodulator are generated by the preceding multipath interference canceling units according to the following expression.

$$r_{n,l}^{(p)}(t) = r_n(t) - \sum_{m=1}^{M} \sum_{l'=1, l' \neq l}^{L} \hat{i}_{m,n,l'}^{(p-1)}(t) \quad \text{[Expression 121]}$$

N×L received signals after multipath interference cancellation obtained according to Expression 121 are described by Expression 122.

$r_{n,l}^{(p)}(t)$ [Expression 122]

The N×L received signals are provided to a reverse spreading unit (not illustrated) corresponding to the receiving antenna $21_n$ and the path l.

Further, according to the configuration shown by FIG. 8, a channel coefficient estimating unit (not illustrated) of the p-th stage multipath receiving signal demodulator may use a received signal after multipath interference cancellation as described by Expression 123 instead of the received signal $r_n(t)$ when estimating the coefficient $h_{1,1,1}$, which results in a more accurate channel coefficient estimation.

$r_{n,l}^{(p)}(t)$ [Expression 123]

(It is possible to use the channel coefficient of the (p−1)-th multipath receiving signal demodulator for simplification of the configuration.)

As described above, by preparing two or more stages of the multipath receiving signal demodulators according to the present embodiment, the latter stage multipath receiving signal demodulators can use the received signal after multipath interference cancellation, which enables highly accurate channel estimation and transmission symbol sequence estimation. As a result, the received signal sequence as described by Expression 124 is accurately estimated for every reception path between the transmitting antennas and the receiving antennas.

$\hat{i}_{m,n,l}^{(p)}(t)$ [Expression 124]

FIG. 9 is a block diagram of a demodulator 300 that is a first embodiment of the demodulator applicable to the receiving apparatus according to the embodiments of the present invention. The present embodiment uses MLD for the demodulator as the demodulating algorithm.

The demodulator 300 includes a channel coefficient estimating unit 311, N×L reverse spreading units 312 through 315, a transmission symbol candidate generating unit 316, received signal replica generating unit 317, a likelihood calculating unit 318, and a transmitting sequence estimating unit 319. Where a certain unit includes two or more components, they are identified with a suffixed serial number.

An operation of the demodulator 300 is described.

The demodulator 300 is provided with N×L received signals after multipath interference cancellation as described by Expression 125.

$r_{n,l}^{(p)}(t)$ [Expression 125]

The channel coefficient estimating unit 311 estimates the channel coefficients $h_{m,n,l}$ of each path between the receiving antennas and the transmitting antennas (here, it is also possible to use a channel coefficient of a preceding multipath receiving signal demodulator for simplification of the configuration).

Further, N×L received signals after multipath interference cancellation as described by Expression 126 are provided to a reverse spreading unit corresponding to a receiving antenna $21_n$ and the path l such that reverse-spread signals $z'_{n,l}$ are obtained.

$r_{n,l}^{(p)}(t)$ [Expression 126]

The transmission symbol candidate generating unit 316 generates and outputs the transmission symbols $d_{m,i}$ corresponding to each antenna. The received signal replica generating unit 317 receives the transmission symbols and the channel coefficients, and generates received signal replicas as described by Expression 127 according to Expression 128, and outputs the received signal replicas to the likelihood calculating unit 318.

$\hat{z}_{n,l,i_1,i_2,\ldots,i_M}$ [Expression 127]

$\hat{z}_{n,l,i_1,i_2,\ldots,i_M} = h_{1,n,l} \cdot d_{1,i_1} + h_{2,n,l} \cdot d_{2,i_2} + \ldots + h_{M,n,l} \cdot d_{M,i_M}$ [Expression 128]

The likelihood calculating unit 318 receives the reverse-spread signals $z'_{n,l}$ from the reverse spreading units 312 through 315, and the received signal replicas as described by Expression 129.

$\hat{z}_{n,l,i_1,i_2,\ldots,i_M}$ [Expression 129]

Then, the likelihood calculating unit 318 performs error calculations according to the following expression.

$$e_{i_1,i_2,\ldots,i_M} = \sum_{n=1}^{N} \sum_{l=1}^{L} |z'_{n,l} - \hat{z}_{n,l,i_1,i_2,\ldots,i_M}|^2 \quad \text{[Expression 130]}$$

The generated transmission symbols corresponding to each transmitting antenna, and the corresponding error signals are provided to the transmitting sequence estimating unit 319 that outputs a likelihood $\lambda_i$ of a bit transmitted by the transmission symbol sequence. Here, the bit likelihood based on the error signal may be calculated by any available method.

The bit likelihood described above is provided to a channel decoder (for example, a turbo decoder), etc., so that an information bit sequence is finally obtained.

Figure 10:
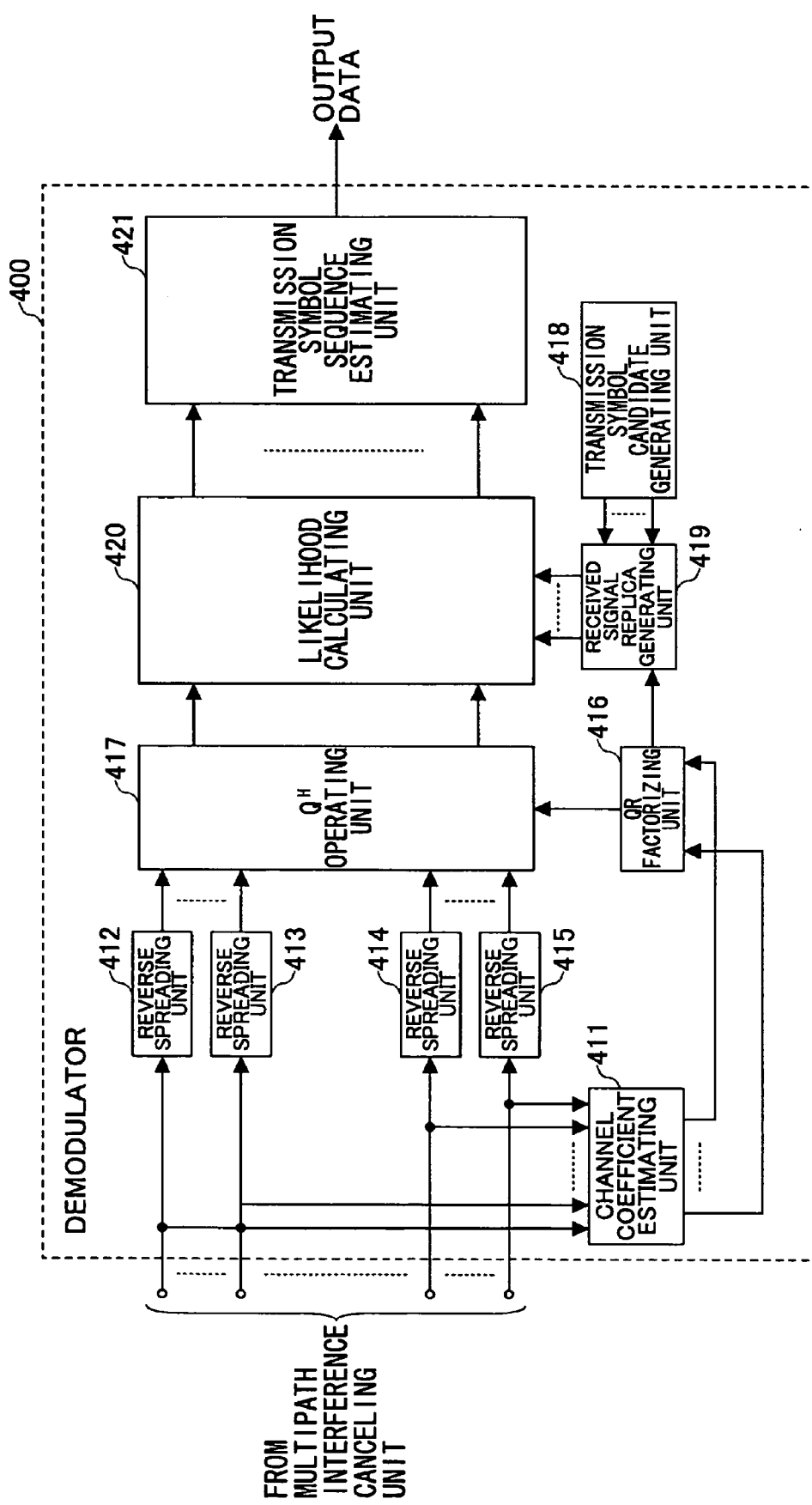
FIG. 10 is a block diagram of a second embodiment of the demodulator according to the present invention.

FIG. 10 is a block diagram of a demodulator 400 that is a second embodiment of the demodulator of the present invention. The second embodiment uses MLD as the demodulating algorithm, wherein paths are grouped into a block for processing.

The demodulator 400 includes a channel coefficient estimating unit 411, N×L reverse spreading units 412 through 415, a QR factorizing unit 416, a $Q^H$ operating unit 417, a transmission symbol candidate generating unit 418, a conversion signal replica generating unit 419, a likelihood calculating unit 420, and a transmitting sequence estimating unit 421. Where a certain unit includes two or more components, they are identified with a suffixed serial number.

Operations of the demodulator 400 are described below.

The demodulator 400 receives N×L signals as described by Expression 131 after multipath interference cancellation.

$r_{n,l}^{(p)}(t)$ [Expression 131]

The channel coefficients $h_{m,n,l}$ of each path of between the receiving antennas and the transmitting antennas are estimated by the channel coefficient estimating unit 411. (Here, it is also possible similarly to use a channel coefficient in a preceding multipath receiving signal demodulator for simplification of the configuration).

Furthermore, the N×L received signals after multipath interference cancellation $r_{n,l}^{(p)}(t)$ [Expression 132]

are provided to the reverse spreading unit corresponding to the receiving antenna $21_n$ and path l, and reverse-spread signals $z'_{n,l}$ are obtained.

Next, the QR factorizing unit 416 generates the following channel matrix (Expression 133) containing channel coefficients, performs QR factorization of the channel matrix, and outputs a Q matrix and a R matrix to the $Q^H$ operating unit 417.

$$\text{Channel Matrix } H = \begin{bmatrix} h_{1,1,1} & h_{2,1,1} & h_{3,1,1} & h_{4,1,1} \\ h_{1,2,1} & h_{2,2,1} & h_{3,2,1} & h_{4,2,1} \\ h_{1,3,1} & h_{2,3,1} & h_{3,3,1} & h_{4,3,1} \\ h_{1,4,1} & h_{2,4,1} & h_{3,4,1} & h_{4,4,1} \\ h_{1,1,2} & h_{2,1,2} & h_{3,1,2} & h_{4,1,2} \\ h_{1,2,2} & h_{2,2,2} & h_{3,2,2} & h_{4,2,2} \\ h_{1,3,2} & h_{2,3,2} & h_{3,3,2} & h_{4,3,2} \\ h_{1,4,2} & h_{2,4,2} & h_{3,4,2} & h_{4,4,2} \end{bmatrix}$$ [Expression 133]

(In this example, $M = 4$, $N = 4$, $L = 2$)

$H = QR$

The Q matrix output from the QR factorizing unit 417 is a unitary matrix having (N×L) rows×M columns, and suffices $Q^H Q = I$. Further, the R matrix is an upper triangular matrix having M rows×M columns. Accordingly, an operation carried out by the $Q^H$ operating unit 417 can be described as follows.

[Expression 134]

$$X = \begin{bmatrix} x_1 \\ x_2 \\ x_3 \\ x_4 \end{bmatrix}$$

$= Q^H Z$ $$= \begin{bmatrix} q^*_{1,1,1} & q^*_{1,2,1} & q^*_{1,3,1} & q^*_{1,4,1} & q^*_{1,1,2} & q^*_{1,2,2} & q^*_{1,3,2} & q^*_{1,4,2} \\ q^*_{2,1,1} & q^*_{2,2,1} & q^*_{2,3,1} & q^*_{2,4,1} & q^*_{2,1,2} & q^*_{2,2,2} & q^*_{2,3,2} & q^*_{2,4,2} \\ q^*_{3,1,1} & q^*_{3,2,1} & q^*_{3,3,1} & q^*_{3,4,1} & q^*_{3,1,2} & q^*_{3,2,2} & q^*_{3,3,2} & q^*_{3,4,2} \\ q^*_{4,1,1} & q^*_{4,2,1} & q^*_{4,3,1} & q^*_{4,4,1} & q^*_{4,1,2} & q^*_{4,2,2} & q^*_{4,3,2} & q^*_{4,4,2} \end{bmatrix} \begin{bmatrix} z_{1,1} \\ z_{2,1} \\ z_{3,1} \\ z_{4,1} \\ z_{1,2} \\ z_{2,2} \\ z_{3,2} \\ z_{4,2} \end{bmatrix}$$

$Q^H (HD + N) = Q^H (QRD + N)$ $= RD + Q^H N$ $$= \begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix} \begin{bmatrix} d_1 \\ d_2 \\ d_3 \\ d_4 \end{bmatrix} + \begin{bmatrix} n'_1 \\ n'_2 \\ n'_3 \\ n'_4 \end{bmatrix}$$

(In this example, M=4, N=4, L=2)

The transmission symbol candidate generating unit 418 generates and outputs the transmission symbols $d_{M,j}$ corresponding to the transmitting antenna $11_M$. The conversion signal replica generating unit 419 receives the transmission symbols $d_{M,j}$ and the R matrix. Then, the conversion signal replica generating unit 419 generates conversion signal replicas as described by Expression 135 according to Expression 136, and outputs the conversion signal replicas to the likelihood calculating unit 420.

$\hat{x}_{M,j}$ [Expression 135]

$\hat{x}_{M,i} = r_{MM} \cdot d_{M,i}$ [Expression 136]

The likelihood calculating unit 420 calculates errors between $x'_M$ and $\hat{x}_{M,j}$ (Expression 137) according to Expression 138.

$\hat{x}_{M,j}$ [Expression 137]

$e_{M,i} = |x'_M - \hat{x}_{M,i}|^2$ [Expression 138]

The generated transmission symbol sequences corresponding to the transmitting antenna $11_M$ and corresponding error signals are provided to the likelihood calculating unit 420 for generating $S_M$ transmission symbols as described by Expression 139 having smaller numbers of errors corresponding to the transmitting antenna $11_M$.

$d_{M,i(1)} \sim d_{M,i(S_M)}$ [Expression 139]

The likelihood calculating unit 420 further calculates errors at that time as shown by Expression 140.

$e_{M,i(1)} \sim e_{M,i(S_M)}$ [Expression 140]

The transmission symbol candidate generating unit 418 generates the transmission symbols as described by Expression 141 corresponding to the transmitting antenna $11_{M-1}$, and outputs the transmission symbols.

$d_{M-1,i}$ [Expression 141]

The conversion signal replica generating unit 419 receives the R matrix, the $S_M$ transmission symbol sequences corresponding to the transmitting antenna $11_M$ and, the transmission symbols corresponding to the transmitting antenna $11_{M-1}$ for generating conversion signal replicas as described by Expression 142 using Expression 143, and the conversion signal replicas are output.

$$\hat{x}_{M-1, i_{M-1}, i_M} \quad \text{[Expression 142]}$$

$$\hat{x}_{M-1, i_{M-1}, i_M} = \hat{r}_{(M-1)(M-1)} \cdot d_{M-1, i_{M-1}} + \hat{r}_{(M-1)M} \cdot d_{M, i_M} \quad \text{[Expression 143]}$$

Subsequently, the likelihood calculating unit 420 performs error calculations according to the following expression.

$$e_{M-1, i_{M-1}, i_M} = |x_{M-1} - \hat{x}_{M-1, i_{M-1}, i_M}|^2 + e_{M, i_M} \quad \text{[Expression 144]}$$

The likelihood calculating unit 420 holds $S_{M-1}$ combinations of the transmission symbol sequences corresponding the transmitting antenna $11_M$ and the transmitting antenna $11_{M-1}$, the combinations having smaller numbers of errors.

$$\{d_{M-1, i_{M-1}(1)}, d_{M, i_M(1)}\} \sim \{d_{M-1, i_{M-1}(S_{M-1})}, d_{M, i_M(S_M-1)}\} \quad \text{[Expression 145]}$$

Further, the likelihood calculating unit 420 holds the errors at that time as described by Expression 146.

$$e_{M-1, i_{M-1}(1), i_M(1)} \sim e_{M-1, i_{M-1}(S_{M-1}), i_M(S_{M-1})} \quad \text{[Expression 146]}$$

Similarly, the transmission symbol candidate generating unit 418 generates and outputs the transmission symbols $d_{m,i}$ corresponding to the transmitting antenna $11_m$. The conversion signal replica generating unit 419 receives the $S_{m+1}$ transmission symbol sequences corresponding to the transmitting antennas from $11_{m+1}$ to $11_M$, the transmission symbol corresponding to the transmitting antenna $11_m$, and the R matrix for generating conversion signal replicas as described by Expression 147 according to Expression 148, and output the conversion signal replicas.

$$\hat{x}_{m, i_m, i_{m+1}, \ldots, i_M} \quad \text{[Expression 147]}$$

$$\hat{x}_{m, i_m, i_{m+1}, \ldots, i_M} = \hat{r}_{mm} \cdot d_{m, i_m} + \hat{r}_{m(m+1)} \cdot d_{m, i_{m+1}} + \ldots + \hat{r}_{mM} \cdot d_{m, i_M} \quad \text{[Expression 148]}$$

The likelihood calculating unit 420 performs error calculations according to the following expression.

$$e_{m, i_m, \ldots, i_{M-1}, i_M} = |x'_m - \hat{x}_{m, i_m, i_{m+1}, \ldots, i_M}|^2 + e_{m+1, i_{m+1}, i_{m+2}, \ldots, i_M} \quad \text{[Expression 149]}$$

The likelihood calculating unit 420 holds $S_m$ combinations as described by Expression 150 of the transmission symbol sequences corresponding to the transmitting antennas from $11_m$ to $11_M$, the combinations having smaller numbers of errors.

$$\{d_{m, i_{m(1)}}, d_{m+1, i_{m+1}(1)}, \ldots, d_{M, i_{M(1)}}\} \sim \\ \{d_{m, i_{m(S_m)}}, d_{m+1, i_{m+1}(S_m)}, \ldots, d_{M, i_{M(S_m)}}\} \quad \text{[Expression 150]}$$

Further, the likelihood calculating unit 420 holds the errors at that time as described by Expression 151.

$$e_{m, i_{m(1)}, i_{m+1}(1), \ldots, i_M(1)} \sim e_{m, i_{m(S_m)}, i_{m+1}(S_m), \ldots, i_M(S_m)} \quad \text{[Expression 151]}$$

By repeating the operations described above, $C \times S_2$ combinations of the transmission symbol sequences corresponding to all the transmitting antennas as described by Expression 152 are obtained.

$$\{d_{1, i_1, (j)}, d_{2, i_2, (j)}, \ldots, d_{M, i_M(j)}\} \quad \text{[Expression 152]}$$

Further, the errors as described by Expression 153 at that time are obtained.

$$e_{m, i_1(j), i_2(j), \ldots, i_M(j)} \quad \text{[Expression 153]}$$

The transmitting sequence estimating unit 421 receives the surviving transmission symbols corresponding to each transmitting antenna and the corresponding error signals, and outputs a likelihood $\lambda_i$ of a bit transmitted by the transmission symbol sequence. Here, the bit likelihood based on the error signal can be calculated using any available method.

The bit likelihood described is provided to a channel decoder (for example, a turbo decoder) etc., and an information bit sequence is finally obtained.

According to the demodulator 400, the number of times of error calculations is greatly reduced to $$C + \sum_{m=1}^{M-1} CS_{m+1}$$

as described by Expression 154 in comparison with $C^M$ times required of the demodulator 300 that is shown by FIG. 9, although some degradation in the bit likelihood estimation has to be tolerated.

$$C + \sum_{m=1}^{M-1} CS_{m+1} \quad \text{[Expression 154]}$$

In this way, the complexity of the receiving apparatus can be greatly decreased.

Figure 11:
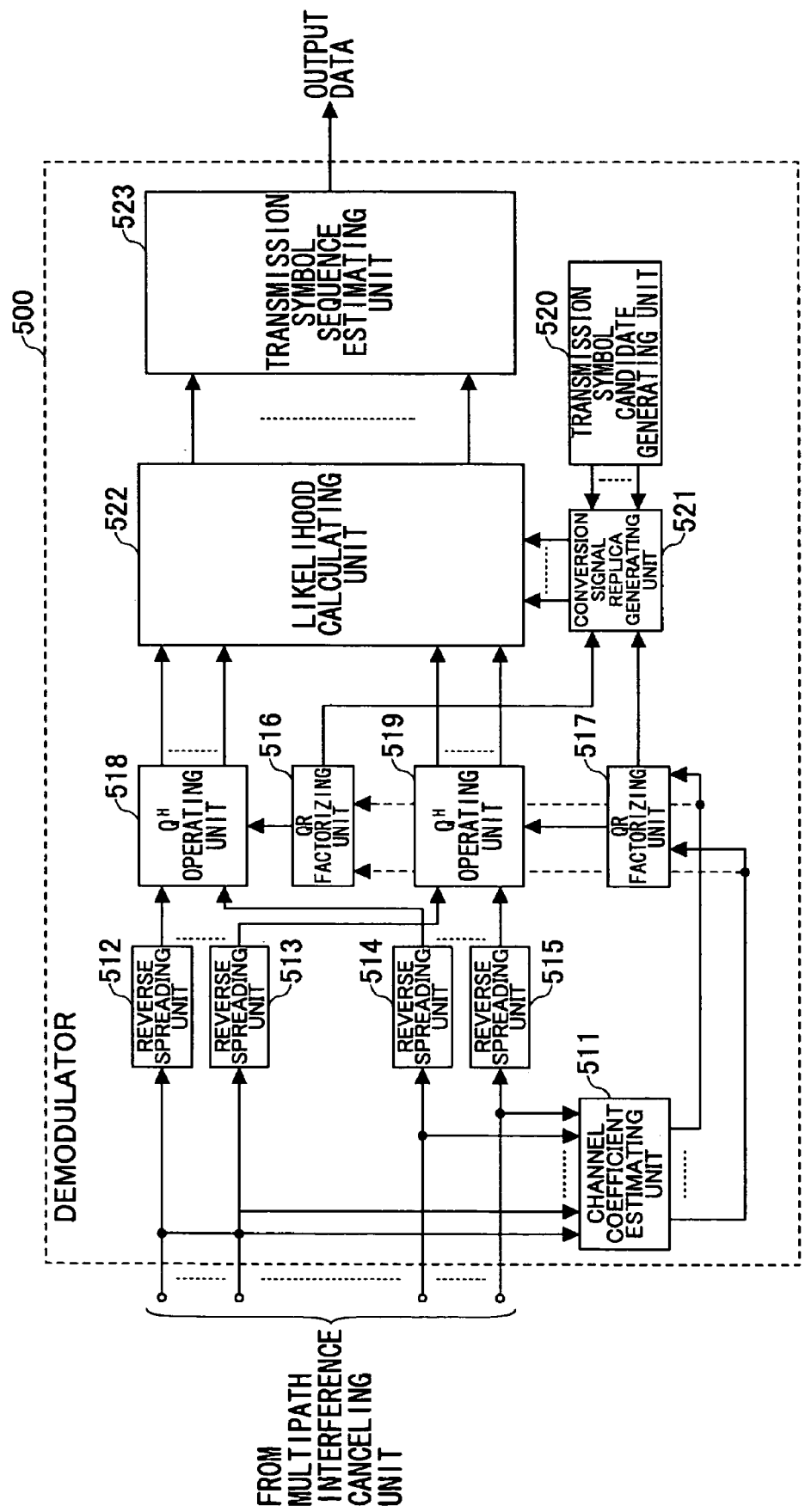
FIG. 11 is a block diagram of a third embodiment of the demodulator according to the present invention.

FIG. 11 shows a demodulator 500 that is a third embodiment of the demodulator of the present invention. According to the demodulator 500 of the third embodiment, each path is processed by a demodulating algorithm that employs MLD.

The demodulator 500 includes a channel coefficient estimating unit 511, N×L reverse spreading units 512 through 515, L QR factorizing units 516 and 517, L $Q^H$ operating units 518 and 519, a transmission symbol candidate generating unit 520, a conversion signal replica generating units 521, a likelihood calculating units 522, and a transmitting sequence estimating unit 523. Where a certain unit includes two or more components, they are identified with a suffixed serial number.

Operations of the demodulator 500 are described below.

The demodulator 500 receives N×L input signals that are the received signals after multipath interference cancellation as described by Expressed 155.

$$r_{n,l}^{(p)}(t) \quad \text{[Expression 155]}$$

The channel coefficient estimating unit 511 estimates the channel coefficients $h_{m,n,l}$ of each path between the receiving antennas and the transmitting antennas. (Here, it is possible to use a channel coefficient of a preceding multipath receiving signal demodulator for simplification of the configuration).

Furthermore, the N×L received signals after multipath interference cancellation as described by Expression 156 are provided to the reverse spreading unit corresponding to the receiving antenna $21_n$ and the path l so that the reverse-spread signals $z'_{n,l}$ are obtained.

$$r_{n,l}^{(p)}(t) \quad \text{[Expression 156]}$$

Next, the l-th QR factorizing unit generates the following channel matrix containing channel coefficients of the l-th path for each path, performs QR factorization of the channel matrix so that the Q matrix and the R matrix are output.

$$\text{Channel Matrix } H_l = \begin{bmatrix} h_{1,1,l} & h_{2,1,l} & h_{3,1,l} & h_{4,1,l} \\ h_{1,2,l} & h_{2,2,l} & h_{3,2,l} & h_{4,2,l} \\ h_{1,3,l} & h_{2,3,l} & h_{3,3,l} & h_{4,3,l} \\ h_{1,4,l} & h_{2,4,l} & h_{3,4,l} & h_{4,4,l} \end{bmatrix}$$ [Expression 157]

(Example where M=4, N=4)

$H_l = Q_l R_l$

A $Q_l$ matrix output by the QR factorizing unit is a unitary matrix having N rows×M columns, and suffices $Q_l^H Q_l = I$. Here, H expresses a conjugate complex transposition, and "I" expresses a unit matrix. Further, a $R_l$ matrix turns into an upper triangular matrix having M rows×M columns.

Accordingly, the operation carried out by the l-th $Q^H$ operating unit can be described as follows.

$$X_l = \begin{bmatrix} x'_1 \\ x'_2 \\ x'_3 \\ x'_4 \end{bmatrix}$$ [Expression 158]

$$= Q_l^H Z_l$$

$$= \begin{bmatrix} q^*_{1,1,l} & q^*_{1,2,l} & q^*_{1,3,l} & q^*_{1,4,l} \\ q^*_{2,1,l} & q^*_{2,2,l} & q^*_{2,3,l} & q^*_{2,4,l} \\ q^*_{3,1,l} & q^*_{3,2,l} & q^*_{3,3,l} & q^*_{3,4,l} \\ q^*_{4,1,l} & q^*_{4,2,l} & q^*_{4,3,l} & q^*_{4,4,l} \end{bmatrix} \begin{bmatrix} z_{1,l} \\ z_{2,l} \\ z_{3,l} \\ z_{4,l} \end{bmatrix}$$

$$Q_l^H (H_l D + N) = Q_l^H (Q_l R_l D + N)$$

$$= R_l D + Q_l^H N$$

$$= \begin{bmatrix} r_{11,l} & r_{12,l} & r_{13,l} & r_{14,l} \\ 0 & r_{22,l} & r_{23,l} & r_{24,l} \\ 0 & 0 & r_{33,l} & r_{34,l} \\ 0 & 0 & 0 & r_{44,l} \end{bmatrix} \begin{bmatrix} d_1 \\ d_2 \\ d_3 \\ d_4 \end{bmatrix} + \begin{bmatrix} n'_{1,l} \\ n'_{2,l} \\ n'_{3,l} \\ n'_{4,l} \end{bmatrix}$$

(Example where M=4, N=4)

The transmission symbol candidate generating unit 520 generates the transmission symbols $d_{M,i}$ corresponding to the transmitting antenna $11_M$, and outputs the transmission symbols $d_{M,i}$ to the conversion signal replica generating unit 521. The conversion signal replica generating unit 521 receives the transmission symbols $d_{M,i}$ and the $R_l$ matrix so that the conversion signal replicas as described by Expression 159 are generated according to Expression 160, and output.

$\hat{x}_{M,l}$ [Expression 159]

$\hat{x}_{M,l,i} = \hat{r}_{MM,l} \cdot d_{M,l,i}$ [Expression 160]

The likelihood calculating unit 522 performs error calculations using $x'_{M,l}$ and the conversion signal replicas as described by Expression 161 according to Expression 162.

$\hat{x}_{M,l,i}$ [Expression 161]

$$e_{M,i} = \sum_{l=1}^{L} |x'_{m,l} - x_{M,l,i}|^2$$ [Expression 162]

After the error calculations, the likelihood calculating unit 522 receives generated transmission symbol sequences corresponding to the transmitting antenna $11_M$, and the corresponding error signals. The likelihood calculating unit 522 holds $S_M$ transmission symbol sequences having smaller numbers of errors corresponding to the transmitting antenna $11_M$ as described by Expression 163.

$d_{M,i(1)} \sim d_{M,i(S_M)}$ [Expression 163]

Further, the likelihood calculating unit 522 holds the errors at that time as described by Expression 164.

$e_{M,i(1)} \sim e_{M,i(S_M)}$ [Expression 164]

Next, the transmission symbol candidate generating unit 520 generates and outputs transmission symbols $d_{M-1,i}$ corresponding to the transmitting antenna $11_{M-1}$.

The conversion signal replica generating unit 521 receives the R matrix, the $S_M$ transmission symbol sequences corresponding to the transmitting antenna $11_M$ and the transmission symbol corresponding to the transmitting antenna $11_{M-1}$ for generating conversion signal replicas as described by Expression 165 according to Expression 166, and outputting the conversion signal replicas.

$\hat{x}_{M-1,l,i_{M-1},i_M}$ [Expression 165]

$\hat{x}_{M-1,l,i_{M-1},i_M} = \hat{r}_{(M-1)(M-1),l} \cdot d_{M-1,i_{M-1}} + \hat{r}_{(M-1)M,l} \cdot d_{M,i_M}$ [Expression 166]

Subsequently the likelihood calculating unit 522 performs error calculations according to the following expression.

$$e_{M-1,i_{M-1},i_M} = \sum_{l=1}^{L} |x'_{M-1} - \hat{x}_{M-1,i_{M-1},i_M}|^2 + e_{M,i_M}$$ [Expression 167]

The likelihood calculating unit 522 holds $S_{M-1}$ combinations as described by Expression 168 of the transmission symbol sequences corresponding the transmitting antenna $11_M$ and the transmitting antenna $11_{M-1}$ having smaller numbers of errors.

$\{d_{M-1,i_{M-1}(1)}, d_{M,i_M(1)}\} \sim \{d_{M-1,i_{M-1}(S_{M-1})}, d_{M,i_M(S_M-1)}\}$ [Expression 168]

Further, the likelihood calculating unit 522 holds the errors at that time as described by Expression 169.

$e_{M-1,i_{M-1}(1),i_M(1)} \sim e_{M-1,i_{M-1}(S_{M-1}),i_M(S_{M-1})}$ [Expression 169]

Similarly, the transmission symbol candidate generating unit 520 generates and outputs the transmission symbols $d_{m,i}$ corresponding to the transmitting antenna $11_m$. The conversion signal replica generating unit 521 receives the R matrix, $S_{m+1}$ transmission symbol sequences corresponding to the transmitting antennas m+1 to M, and the transmission symbol corresponding to the transmitting antenna $11_m$ for generating conversion signal replicas as described by Expression 170 according to Expression 171, and output.

$$\hat{x}_{m,i_m,i_{m+1},\ldots,i_M} \quad \text{[Expression 170]}$$

$$\hat{x}_{m,i_m,i_{m+1},\ldots,i_M}=\hat{r}_{mm,l}\cdot d_{m,i_m}+\hat{r}_{m(m+1),l}\cdot d_{m,i_{m+1}}+\cdots+\hat{r}_{mM,l}\cdot d_{m,i_M} \quad \text{[Expression 171]}$$

The likelihood calculating unit 522 performs error calculations according to the following expression.

$$e_{m,i_m,\ldots,i_{M-1},i_M} = \quad \text{[Expression 172]}$$
$$\sum_{l=1}^{L} |x'_{m,l} - \hat{x}_{m,l,i_m,i_{m+1},\ldots,i_M}|^2 + e_{m+1,i_{m+1}\cdot i_{m+2},\ldots,i_M}$$

The likelihood calculating unit 522 holds $S_m$ combinations of the transmission symbol sequences corresponding to the transmitting antennas $11_m$ to $11_M$ having smaller numbers of errors as described by Expression 173.

$$\{d_{m,i_{m(1)}}, d_{m+1,i_{m+1(1)}}, \ldots, d_{M,i_{M(1)}}\} \sim \quad \text{[Expression 173]}$$
$$\{d_{m,i_{m(S_m)}}, d_{m+1,i_{m+1(S_m)}}, \ldots, d_{M,i_{M(S_m)}}\}$$

Further, the likelihood calculating unit 522 holds the errors at that time as described by Expression 174.

$$e_{m,i_m(1),i_{m+1}(1),\ldots,i_M(1)} \sim e_{m,i_m(S_m),i_{m+1}(S_m),\ldots,i_M(S_m)} \quad \text{[Expression 174]}$$

By repeating the above operations, $C \times S_2$ combinations of the transmission symbol sequences corresponding to all the transmitting antennas, and the errors at that time are obtained as described by Expressions 175 and 176, respectively.

$$\{d_{1,i_1(j)}, d_{2,i_2(j)}, \ldots, d_{M,i_M(j)}\} \quad \text{[Expression 175]}$$

$$e_{m,i_1(j),i_2(j),\ldots,i_M(j)} \quad \text{[Expression 176]}$$

The transmitting sequence estimating unit 523 receives the surviving transmission symbols corresponding to each transmitting antenna obtained by the L likelihood calculating units, and the corresponding error signals; and outputs a likelihood $\lambda_i$ transmitted by the transmission symbol sequence based on the sum of L error signals. Here, the bit likelihood based on the error signals can be calculated using any available method.

The bit likelihood described above is provided to a channel decoder (for example, turbo decoder), etc., and, the information bit sequence is finally obtained.

According to the demodulator 500 (FIG. 11) the number of times of error calculations is greatly reduced to $$C + \sum_{m=1}^{M-1} CS_{m+1}$$

as described by Expression 177 in comparison with $C^M$ times required of the demodulator 300 that is shown by FIG. 9, although some degradation in the bit likelihood estimation has to be tolerated.

$$C + \sum_{m=1}^{M-1} CS_{m+1} \quad \text{[Expression 177]}$$

In this way, the complexity of the receiving apparatus is greatly reduced.

Figure 12:
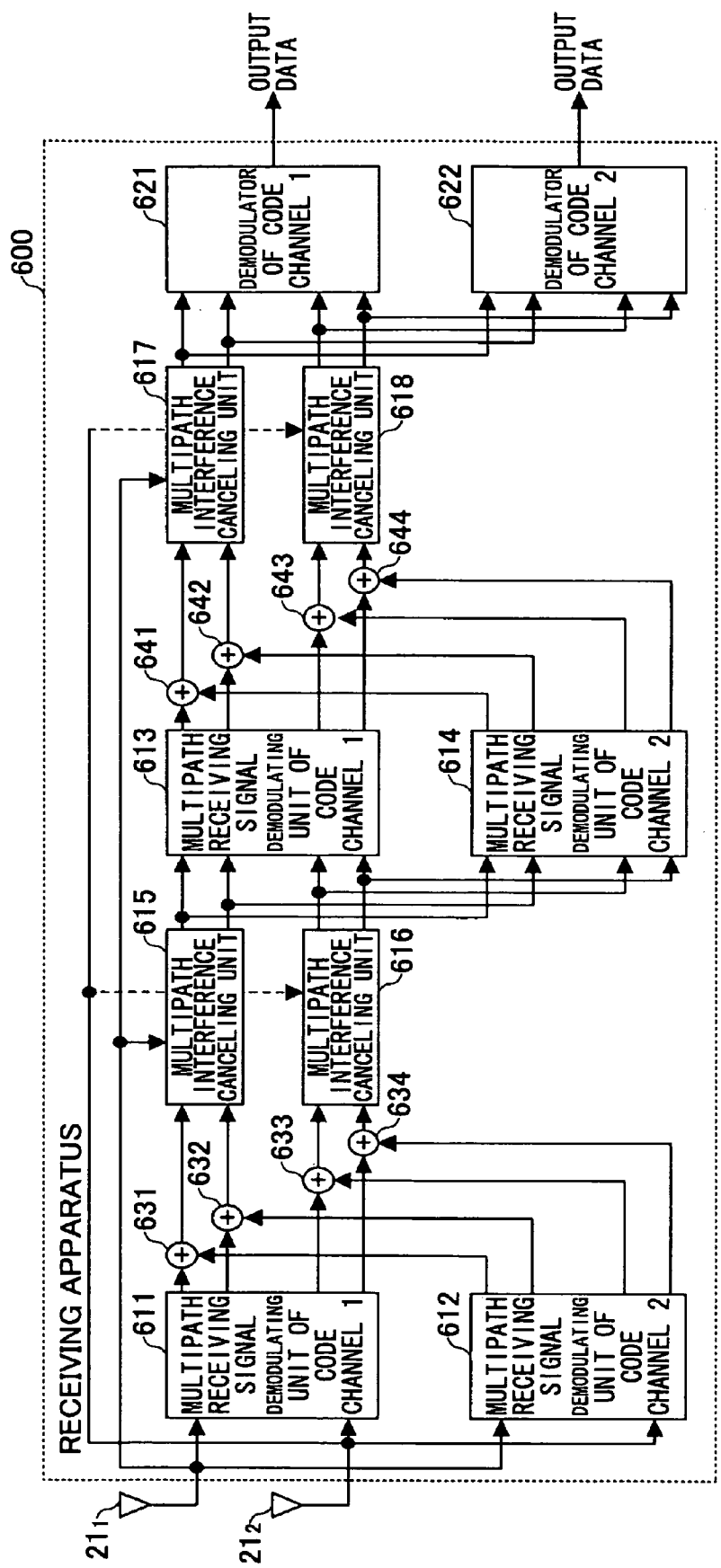
FIG. 12 is a block diagram of a third embodiment of the receiving apparatus according to the present invention.

FIG. 12 is a block diagram of a receiving apparatus 600 that is a third embodiment of the receiving apparatus according to the present invention. The receiving apparatus 600 constitutes a radio communications system wherein a transmitting apparatus (not illustrated) performs serial parallel conversion of a transmitting data bit sequence into M transmitting sequences, which sequences are modulated with the same frequency and the same spreading code group, and are simultaneously transmitted by $N_{code}$ multicode channels from M transmitting antennas.

The receiving apparatus 600 includes multipath receiving signal demodulators 611 through 614 corresponding to each code channel (each of code channels 1 and 2 in this example) for a predetermined number of stages, demodulators 621 and 622 corresponding to each code channel, and multipath interference canceling units 615 through 618. The multipath interference canceling units 615 through 618 are inserted between one and another of the multipath receiving signal demodulators 611 through 614, or between one of the multipath receiving signal demodulators 611 through 614 and one of the demodulators 621 and 622, as applicable.

According to the present embodiment, the multipath receiving signal demodulators 611 and 612 that represent the first stage of each code channel receive signals $r_n(t)$ that are received by corresponding N receiving antennas (N=2 in this example), and output demodulated signal sequences as described by Expression 178 for each reception path from the transmitting antennas corresponding to the code channels.

$$\hat{I}_{m,n,l,k}^{(p)}(t) = \hat{h}_{m,n,l(t)} \tilde{d}_m^{(p)}(t) \cdot c_k(t-\tau_l) \quad \text{[Expression 178]}$$

where k represents a code number that is limited by Expression 179.

$$1 \leq k \leq N_{code} c_k(t) \quad \text{[Expression 179]}$$

The multipath interference canceling units 615 and 616 (note that N=2 in this example) receive the signals $r_n(t)$, and demodulated signal sequences of all the code channels as described by Expression 180 through corresponding adders 631 through 634.

$$\hat{I}_{m,n,l,k}^{(p)}(t) \quad \text{[Expression 180]}$$

The multipath interference canceling units 615 and 616 then generate received signals after multipath interference cancellation as described by Expression 181 according to Expression 182.

$$r_{n,l}^{(p)}(t) \quad \text{[Expression 181]}$$

$$r_{n,l}^{(p)}(t) = r_n(t) - \sum_{m=1}^{M} \sum_{l'=1,l'\neq l}^{L} \sum_{k=1}^{N_{code}} \hat{I}_{m,n,l',k}^{(p-1)}(t) \quad \text{[Expression 182]}$$

The multipath receiving signal demodulators 613 and 614 that are the second stage of the corresponding code channels receive the received signals after multipath interference cancellation as described by Expression 183.

$$r_{n,l}^{(p)}(t) \quad \text{[Expression 183]}$$

The operations described are repeated for subsequent stages as applicable, and final received signals after multipath interference cancellation as described by Expression 184 are generated.

$$r_{n,l}^{(p)}(t) \quad \text{[Expression 184]}$$

The final received signals after multipath interference cancellation generated as above are provided to the corresponding demodulators 621 and 622 of each code channel, and the demodulators 621 and 622 output the likelihood of a bit being transmitted by the transmission symbol sequence in each code channel.

Figure 13:
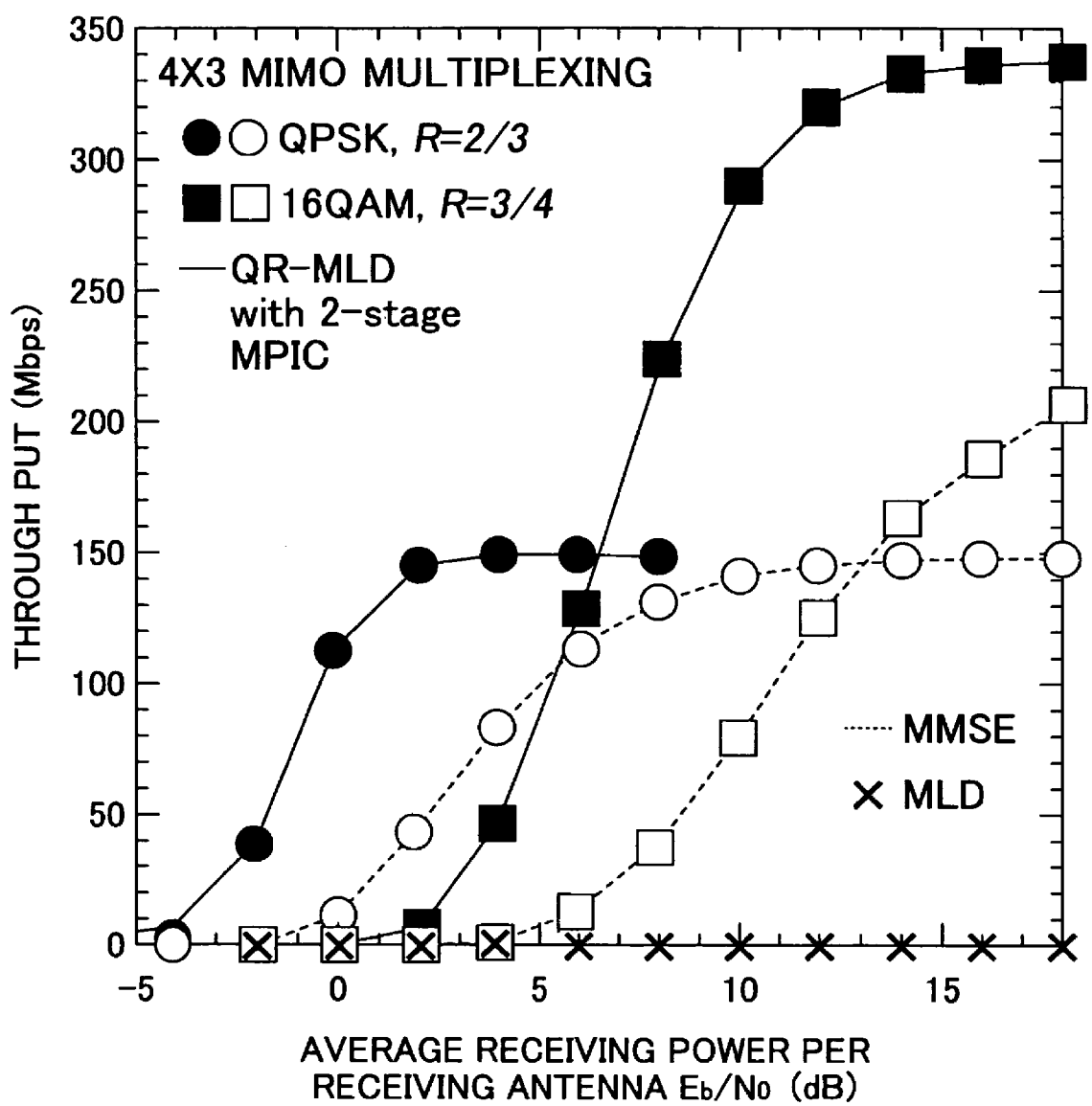
FIG. 13 is a graph showing results of a computer simulation about the present invention.
Figure 14:
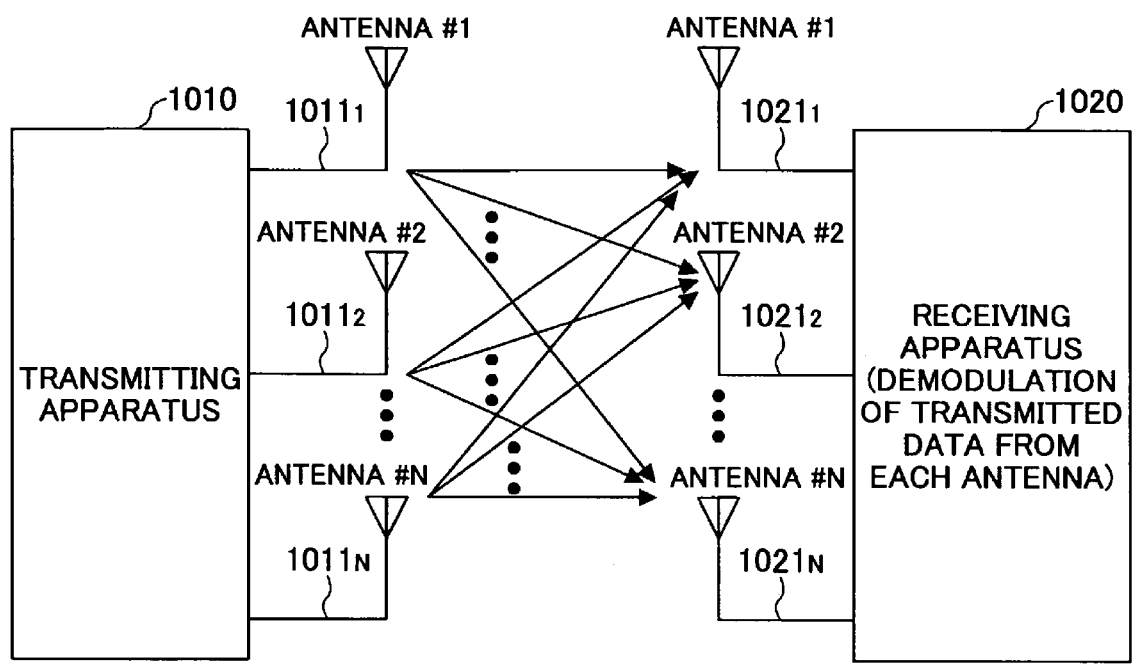
FIG. 14 is a block diagram of a MIMO communication system using two or more antennas.
Figure 15:
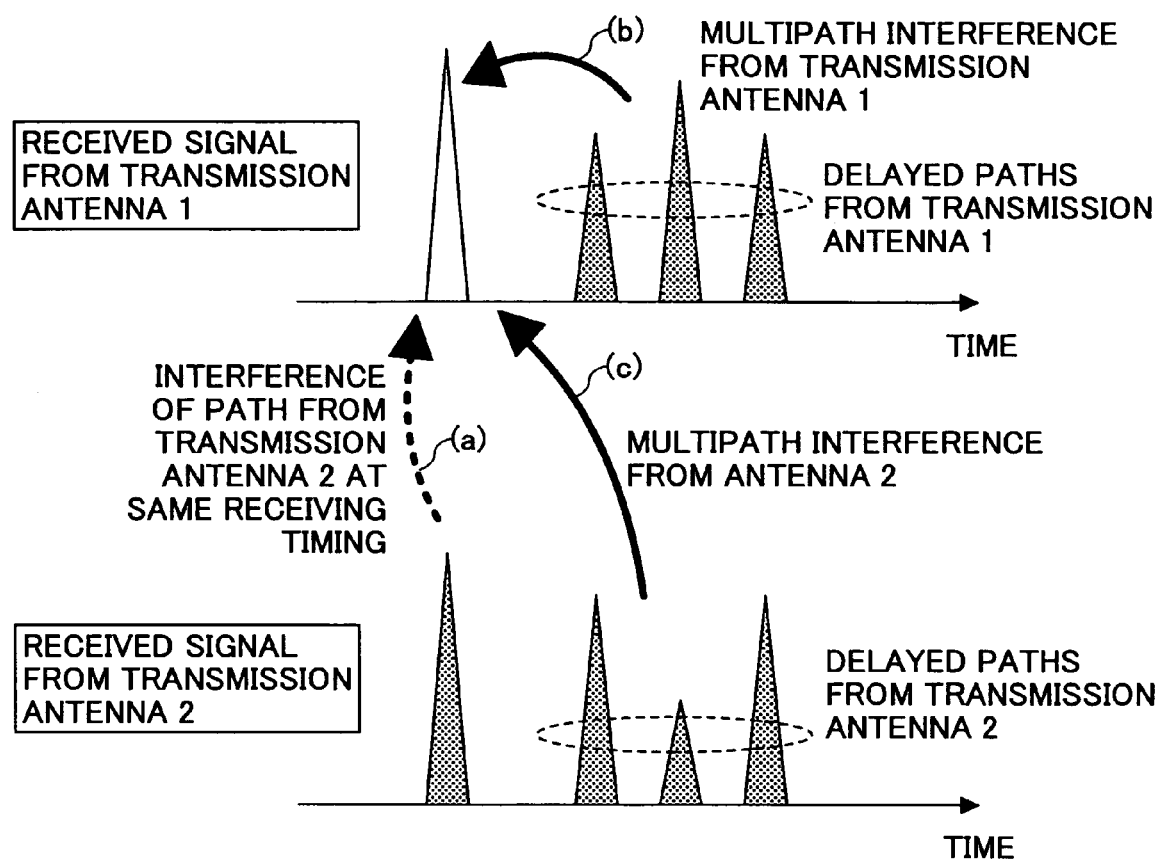
FIG. 15 is a schematic diagram showing that accuracy of demodulation (signal separation) deteriorates due to multipath interference in the case of MIMO multiplexing of DS-CDMA.

Next, computer simulations of the embodiments of the present invention are described with reference to FIG. 13. FIG. 13 shows computer simulation results of throughput property (vertical axis) over average receiving $Eb/N_o$ per receiving antenna (signal energy to the noise power density per 1 bit of information) (horizontal axis) of various demodulating methods used by the receiving apparatus; namely, the conventional MLD, the conventional 2-dimensional MMSE, and the method of the present invention.

The receiving apparatus applied to the computer simulation includes two stages of the multipath receiving signal demodulators, where the configuration of FIG. 2 is used for the first stage, and the configuration of FIG. 4 is used for the second. Further, as for the multipath, a two-path model is used where both paths provide the same average received power.

The spreading rate is 16, and 15 code channels are code-multiplexed (effective spreading rate is 15/16). In FIG. 13, a coding rate of channel coding using turbo coding is indicated by "R", solid lines represent properties according to the present invention (QR-MLD with two-stage MPIC), dotted lines represent properties of the conventional MMSE, and X marks represent properties of the conventional MLD. Further, ● and ○ marks represent the average receiving Eb/No per receiving antenna in the case of MIMO multiplexing (4 transmitting antenna, 4 receiving antennas) using QPSK modulation; ■ and □ marks represent the average receiving Eb/No per receiving antenna in the case of MIMO multiplexing using 16QAM modulation.

As shown by FIG. 13, average received power Eb/No required for obtaining a certain level of the throughput is greatly reduced by using the configuration of the receiving apparatus according to the embodiments of the present invention as compared with the case where the conventional signal separating method is used. That is, the receiving apparatus of the present invention requires less transmission power to obtain the same throughput as conventional apparatuses. In other words, the same transmitted power provides a greater throughput with the receiving apparatus according to the embodiments of the present invention.

As described above, according to the present invention, when the MIMO multiplexing is used for simultaneous transmission of different data from two or more transmitting antennas in order to increase an information bit rate in a CDMA system, highly accurate signal separation is obtained, reducing the multipath interference. Consequently, the receiving bit error rate and receiving packet error rate in a multipath fading environment are greatly reduced, and the throughput (information bit transmission rate that provides no errors) is greatly raised.

Although the multipath receiving signal demodulator has been described as using algorithms (for example, a program that describes the algorithm) such as MMSE and MLD, other algorithms such as QR-MLD algorithm can be more desirable for obtaining accurate signal separation by a realistic amount of calculations.

Further, although the receiving apparatus has been described as being used in a radio communications system, the receiving apparatus can be applied to a base station of a mobile communications system. Further, the algorithm of the present invention can be applied to a so-called software radio base station, to which the algorithm is selectively downloaded to a radio apparatus through a radio circuit or a wire circuit for changing properties of the radio apparatus.

AVAILABILITY TO INDUSTRY

The present invention is applicable to a radio communications system that demodulates signals using two or more antennas.

The present application is based on Japanese Priority Application No. 2004-063197 filed on Mar. 5, 2004 with the Japanese Patent Office, the entire contents of which are hereby incorporated by reference.

What is claimed is:

1. A receiving apparatus using a CDMA method for receiving signals by N receiving antennas (N is a positive integer), the signals being transmitted by M transmitting antennas (M is a positive integer), comprising:
    serially coupled multipath receiving signal demodulating units for primary demodulation of the signals received by the receiving antennas, for estimating the signals transmitted from the transmitting antennas, and for obtaining a received signal of each path of the receiving antennas in a multipath environment based on the estimated signals;
    serially coupled multipath interference canceling units for deducting the obtained signals received through the paths other than a target path from the signals received by the receiving antennas to obtain multipath interference cancelled signals; and
    a demodulating unit for secondary demodulation of the multipath interference cancelled signals,
    wherein the multipath receiving signal demodulating units and the multipath interference canceling units are serially arranged in stages, a receiving signal received at each of the receiving antennas is directly inputted to all the serially coupled corresponding multipath interference canceling units without having passed through any of the other multipath interference canceling units, each of the stages other than the first stage updates a channel coefficient estimated based on a known pilot signal transmitted from the M transmitting antennas using a multipath interference cancelled signal provided by a multipath interference canceling unit in an upper stage.

2. The receiving apparatus as claimed in claim 1, wherein the multipath receiving signal demodulating units carry out the primary demodulation using a minimum mean square error (MMSE) method.

3. The receiving apparatus as claimed in claim 1, wherein the multipath receiving signal demodulating units carry out the primary demodulation using a maximum likelihood detection (MLD) method.

4. The receiving apparatus as claimed in claim 1, wherein the multipath receiving signal demodulating units carry out the primary demodulation using a maximum likelihood detection method using QR factorization on a block of a plurality of the paths.

5. The receiving apparatus as claimed in claim 1, wherein the multipath receiving signal demodulating units carry out the primary demodulation using a maximum likelihood detection method using QR factorization on each of the paths.

6. The receiving apparatus as claimed in claim 2, wherein
the multipath receiving signal demodulating units control an amplitude of the signal received, based on a probability of correctness of a transmission symbol sequence estimated using the minimum mean square error (MMSE) method.

7. The receiving apparatus as claimed in claim 2, wherein
the multipath receiving signal demodulating units estimate a channel coefficient using a known pilot signal transmitted from the M transmitting antennas.

8. The receiving apparatus as claimed in claim 1, wherein
the demodulating unit performs the secondary demodulation using a maximum likelihood detection method.

9. The receiving apparatus as claimed in claim 1, wherein
the demodulating unit performs the secondary demodulation using a maximum likelihood detection method using QR factorization on a block of a plurality of the paths.

10. The receiving apparatus as claimed in claim 1, wherein
the demodulating unit performs the secondary demodulation using a maximum likelihood detection method using QR factorization on each of the paths.

11. The receiving apparatus as claimed in claim 1, wherein
when the signals transmitted from the M transmitting antennas are code-multiplexed signals,
the multipath receiving signal demodulating units perform the primary demodulation of the signals received by the corresponding receiving antennas, and obtain the signals of the corresponding paths for all the receiving antennas for all spreading signals,
the multipath interference canceling units deduct the obtained signals corresponding to all the spreading signals received through the paths other than a target path from the signals received by the receiving antennas to obtain multipath interference cancelled signals, and
the demodulating unit performs the secondary demodulation of the multipath interference cancelled signals for each of the spreading signals.

12. A receiving method of a receiving apparatus for receiving a plurality of signals using a CDMA method, the signals being transmitted from M transmitting antennas (M is a positive integer) and received by N receiving antennas (N is a positive integer), comprising:
receiving the signal received by each of the receiving antennas;
estimating, at a plurality of serially coupled multipath receiving signal demodulating units, the signal transmitted from each of the transmitting antennas using a predetermined algorithm;
multiplying, at the serially coupled multipath receiving signal demodulating units, the estimated transmitted signal and a channel coefficient estimated based on a known pilot signal, and obtaining the received signal of each path for each of the receiving antennas in a multipath environment;
deducting, at a plurality of serially coupled multipath interference canceling units, the obtained received signals of the paths other than a target path from the signal received by each of the receiving antennas; and
demodulating the signals that are obtained by the step of deducting,
wherein the multipath receiving signal demodulating units and the multipath interference canceling units are serially arranged in stages, a receiving signal received at each of the receiving antennas is directly inputted to all the serially coupled corresponding multipath interference canceling units without having passed through any of the other multipath interference canceling units, each of the stages other than the first stage updates a channel coefficient estimated based on a known pilot signal transmitted from the M transmitting antennas using a multipath interference cancelled signal provided by a multipath interference canceling unit in an upper stage.

13. A radio communications system, comprising:
the receiving apparatus as claimed in claim 1; and
a transmitting apparatus including the M transmitting antennas (M is a positive integer) for transmitting a CDMA signal from each of the transmitting antennas.

* * * * *